United States Patent
Huber et al.

(10) Patent No.: US 9,756,369 B2
(45) Date of Patent: Sep. 5, 2017

(54) METHOD AND APPARATUS FOR STREAMING MEDIA DATA SEGMENTS OF DIFFERENT LENGTHS WHEREIN THE SEGMENT OF DIFFERENT LENGTH COMPRISING DATA NOT BELONGING TO THE ACTUAL SEGMENT AND BEGINNING WITH KEY FRAMES OR CONTAINING KEY FRAMES ONLY

(71) Applicant: TELEFONAKTIEBOLAGET L M ERICSSON (PUBL), Stockholm (SE)

(72) Inventors: Michael Huber, Taby (SE); Anders Axelsson, Sundyberg (SE); Thorsten Herber, Kista (SE); Johan Kölhi, Vaxholm (SE); Dan Mathiasen, Nacka (SE); Robert Skog, Hässelby (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 14/899,577

(22) PCT Filed: Jun. 19, 2013

(86) PCT No.: PCT/SE2013/050732
§ 371 (c)(1),
(2) Date: Dec. 18, 2015

(87) PCT Pub. No.: WO2014/204366
PCT Pub. Date: Dec. 24, 2014

(65) Prior Publication Data
US 2016/0142750 A1    May 19, 2016

(51) Int. Cl.
*H04N 21/242*      (2011.01)
*H04N 21/43*       (2011.01)
(Continued)

(52) U.S. Cl.
CPC .......... *H04N 21/242* (2013.01); *G11B 27/10* (2013.01); *H04L 65/1089* (2013.01);
(Continued)

(58) Field of Classification Search
CPC ............. H04N 21/242; H04N 21/4302; H04N 21/6125; H04N 21/84; H04N 21/23439;
(Continued)

(56) References Cited

U.S. PATENT DOCUMENTS

| 5,786,845 A | * | 7/1998 | Tsuria | H04N 5/44513 |
| | | | | 348/E5.102 |
| 6,340,987 B1 | * | 1/2002 | Hayashi | H04N 7/17318 |
| | | | | 348/14.01 |

(Continued)

FOREIGN PATENT DOCUMENTS

| DK | EP-0594350 | * | 4/1994 | ............. H04N 7/173 |
| DK | EP0594350 | * | 4/1994 | ............. H04N 7/173 |

OTHER PUBLICATIONS

International Search Report dated Mar. 3, 2014, in International Application No. PCT/SE2013/050732, 6 pages.

(Continued)

*Primary Examiner* — Hoang-Vu A Nguyen-Ba
(74) *Attorney, Agent, or Firm* — Rothwell, Figg, Ernst & Manbeck, P.C.

(57) ABSTRACT

A method and network element for providing at least one segment that is of a different length than the actual segment of a media stream and where the segment of a different length comprises data not belonging to the actual segment, wherein the segment of a different length begins with a key frame or contains key frames only.

17 Claims, 22 Drawing Sheets

(51) Int. Cl.
*H04N 21/61* (2011.01)
*G11B 27/10* (2006.01)
*H04N 21/84* (2011.01)
*H04L 29/06* (2006.01)
*H04N 21/2343* (2011.01)
*H04N 21/845* (2011.01)
*H04N 21/438* (2011.01)

(52) U.S. Cl.
CPC ........ *H04L 65/4084* (2013.01); *H04L 65/605* (2013.01); *H04L 65/607* (2013.01); *H04N 21/23439* (2013.01); *H04N 21/4302* (2013.01); *H04N 21/4384* (2013.01); *H04N 21/6125* (2013.01); *H04N 21/84* (2013.01); *H04N 21/8456* (2013.01)

(58) Field of Classification Search
CPC ........... H04N 21/8456; H04N 21/4384; G11B 27/10; H04L 65/1089; H04L 65/4084; H04L 65/607; H04L 65/605
See application file for complete search history.

(56) References Cited

U.S. PATENT DOCUMENTS

| | | | | |
|---|---|---|---|---|
| 6,473,137 | B1 * | 10/2002 | Godwin | H04N 5/4401 348/725 |
| 6,907,321 | B2 * | 6/2005 | Kearney | H02H 7/266 700/292 |
| 7,237,251 | B1 * | 6/2007 | Oz | H04N 5/4401 348/E5.006 |
| 8,650,603 | B2 * | 2/2014 | Doets | H04N 7/17336 725/100 |
| 2002/0087973 | A1 * | 7/2002 | Hamilton | H04N 5/4401 725/32 |
| 2004/0098741 | A1 * | 5/2004 | Hara | H04N 5/50 725/37 |
| 2007/0143799 | A1 | 6/2007 | Bloebaum | |
| 2007/0211172 | A1 * | 9/2007 | Kondo | H04N 5/44513 348/563 |
| 2015/0052571 | A1 * | 2/2015 | Stokking | H04N 21/242 725/116 |

OTHER PUBLICATIONS

Godana et al. "Impact of Advertisements during Channel Zapping on Quality of Experience" Networking and Services, 2009, ICNS '09, Fifth International Conference on, Apr. 20, 2009 IEEE, Piscataway, NJ, USA, pp. 249-254.
Nahrstedt Multimedia Systems Design Lecture 27—DASH (Dynamic Adaptive Streaming over HTTP), CS 414, Spring 2012 CS 414, Apr. 7, 2012, 31 pages.
van Deventer et al. "Advanced Interactive Television Services Require Content Synchronization" Systems, Signals and Image Processing, 2008, IWSSIP 2008, 15th International Conference on IEEE, Jun. 25, 2008, pp. 109-112.
Mekuria et al. "Digital TV: The Effect of Delay when Watching Football" Proceedings of the 10th European Conference on Interactive TV and Video, EUROITV'12, Jan. 1, 2012, pp. 71-74.
Rao et al. "Optimizing delay in Peer to Peer Live Video Streaming" International Journal of Advanced Research in Computer Science and Software Engineering, Jun. 1, 2012, pp. 79-82.
Robitza et al. "Acceptance of Mobile TV Channel Switching Delays" Proceedings of the 2010 Second International Workshop on Quality of Multimedia Experience (QOMEX 2010), IEEE, Jun. 21, 2010, pp. 236-241.
Al-Wabil et al. "Examining visual attention of dyslexics on web navigation structures with eye tracking", 2008, IEEE, pp. 717-721.
Cometi "Eyetracking Metrics for Usability Studies, inspireUX" 2010, 3 pages.

* cited by examiner

METHOD AND APPARATUS FOR STREAMING MEDIA DATA SEGMENTS OF DIFFERENT LENGTHS WHEREIN THE SEGMENT OF DIFFERENT LENGTH COMPRISING DATA NOT BELONGING TO THE ACTUAL SEGMENT AND BEGINNING WITH KEY FRAMES OR CONTAINING KEY FRAMES ONLY

CROSS REFERENCE TO RELATED APPLICATION(S)

This application is a 35 U.S.C. §371 National Phase Entry Application from PCT/SE2013/050732, filed Jun. 19, 2013, designating the United States, the disclosure of which is incorporated herein in its entirety by reference.

TECHNICAL FIELD

The embodiments relate to media streaming and in particular to a method, a network element, a computer program and a computer program product for reducing user-to-user delay when the users consuming the same media stream.

BACKGROUND

Streaming or media streaming is a technique for transferring data so that it can be processed as a steady and continuous stream. Hence, streaming media is multimedia (e.g. audio and/or video) that is constantly received by and presented to an end-user while being delivered by a provider. "Stream", refers to the process of delivering media in this manner; the term refers to the delivery method of the medium rather than the medium itself.

By using streaming, the client (browser) can start displaying the received media data before the entire file has been transmitted. However, if the streaming client receives the media data more quickly than required, it needs to save the excess media data in a buffer. When the media data to be streamed comprises video pictures, the video pictures can be encoded as P, B, and I frames.

- I-frames are the least compressible but don't require other video frames to decode and are also referred to as key frames. In order to be able to start decoding, a key frame is required.
- P-frames requires data from previous frames to be decodable.
- B-frames requires previous and/or forward frames to be decodable.

It should be noted that P- and B-frames can be compressed to a much larger extent than the key frames.

Adaptive bitrate streaming is used for multimedia streaming. Many adaptive streaming technologies are based on HTTP (Hypertext transfer protocol) and designed to work efficiently over large distributed HTTP networks such as the Internet.

Adaptive bitrate streaming works by detecting a user's bandwidth and/or other relevant parameters such as CPU capacity, hardware decoding capacity etc. in real time and adjusting the quality of a video stream accordingly. It requires the use of an encoder which can encode a single source video at multiple bit rates. The streaming sent to the player client switches between the different encodings depending on available resources. This results in little buffering, fast start time and a good experience for both high-end and low-end connections.

An example of an implementation is adaptive bitrate streaming over HTTP where the source content is encoded at multiple bit rates, and each of the different bit rate streams are segmented into small multi-second parts. This is illustrated in FIG. 1A. The streaming client is made aware of the available streams at differing bit rates, and segments of the streams by a manifest file. When starting, the client requests the segments from the lowest bit rate stream. If the client finds the download speed is greater than the bit rate of the segment downloaded, then it will request the next higher bit rate segments. Later, if the client finds the download speed for a segment is lower than the bit rate for the segment, and therefore the network throughput has deteriorated, then it will request a lower bit rate segment. The segment size can vary depending on the particular implementation, but they are typically between two and ten seconds.

When changing from a first channel (i.e. a first stream) to a second channel (i.e. a second stream), the client must await a key frame in order to be able to decode the second channel.

For example, in the DASH (Dynamic Adaptive Streaming) standard, there can be 5 seconds segments in different bitrates, where each segment starts with a key frame (i.e. an I frame) and the following frames are P- or B-frames.

That can be exemplified by:
NormalA: 5-seconds @2 Mbit/s=10 Mbit
NormalB: 5-seconds @1 Mbit/s=5 Mbit
NormalC: 5-seconds @0.5 Mbit/s=2.5 Mbit
NormalD: 5-seconds @0.25 Mbit/s=1.25 Mbit An intune track is also provided, which comprises multiple I-frames, e.g. one I-frame per second. The intune track can be provided in different bitrates.

Assume that the intune track is only provided in the lowest bitrate:

IntuneD: 5-seconds @0.25 Mbit/s=1.25 Mbit

The "IntuneD" has many I-frames which results in that the quality is lower than for NormalD even though they have the same bitrate. There is also a manifest file which provides information on the different available files including the position of the I-frames.

Thus, the manifest file can include the following information:

IntuneD: Iframes: 0 bits (0 s), 250000 bits (1 s), 500000 bits (2 s), 750000 bits (3 s), 1000000 bits (4 s)

If a user wants to join a channel at t=3.75 seconds. The user performs a http-get on the manifest file and then gets information that there is an Intune file, IntuneD (with 5 seconds). The user then performs a http get on IntuneD but with a bit range of 1000000-1250000. That implies that the user will only get the last second of the file. The user will suffer from a 0.25 seconds delay. Although the amount of data is exemplified in the number of bits in this example, it should be noted that the manifest file usually defines the amount of data in bytes.

However, this procedure requires functionality by the client.

SUMMARY

As mentioned above, the DASH solution for the channel change requires functionality by the clients. Thus a major drawback with solutions that require intelligence by the clients is that all clients must be upgraded when a new feature is to be introduced. It is therefore desired to provide a solution improving channel change in the network which is transparent to the clients.

The embodiments of the present invention relate to streaming media, such as video e.g. together with audio and in particular to zapping between different channels. The media data to be streamed is divided into segments, wherein each segment normally is between two to ten seconds. In video streams each segment comprises one self-contained key frame in the beginning of the segment followed by non-self-contained frames such as P- or B-frames. Since the users can join (zapping to a certain channel) at different time instants and each user has to await a key frame of the segment to be able to decode the segment, the user will suffer from a time delay which may vary between the users.

An object with embodiments is to reduce the zapping delay while also being able to reduce the user-to-user delay caused by the channel change.

This is achieved by providing to a client from a network node an initial segment such that the initial segment V11 has a length, a starting point and an ending point, wherein the starting point is aligned to a time of the request of the media stream and the ending point is aligned to a segment subsequent to the initial segment. The initial segment comprise data not belonging to the original media stream. In this way the initial segment can be provided easily substantially at the time of the request (due to the alignment of the starting point) which reduce the zapping-delay and in addition the client will get in synchronization with the original media stream (due to the alignment of the ending point) which implies that also user-to-user delay is decreased. The initial segment is either shorter or longer than the segments of the original media stream or a set of segments. Accordingly, the total length of the provided initial segment(s) are adjusted to enable the network note to send subsequent segments of the requested media stream at substantially the same time to all clients consuming the stream.

The expression subsequent segment is in this text defined as a segment coming after a segment, either directly subsequent or having a number of segments in-between. For example, in a stream V1, V2, V3, V4 we consider V2, V3, and V4 to be subsequent to V1.

According to a first aspect of the embodiments, a method to be performed by a network element for enabling streaming of media data is provided. The media data is originally divided into segments of a first length Tx provided in a stream. In the method a request for media data is received from a client C1 during streaming of a segment V1 of said stream. Further, a segment V11 of a different length than said first length Tx, such that the segment V11 has a length, a starting point and an ending point, wherein the starting point is aligned to a time of said request and the ending point is aligned to a segment subsequent to V1, is provided to said client C1, where the segment V11 comprise data not belonging to segment V1, and a segment, subsequent to segment V1, of said stream is provided to said client C1 wherein the subsequent segment is a segment that the stream originally was divided in.

According to a second aspect of the embodiments, a network element for enabling streaming of media data is provided. The media data is originally divided into segments of a first length Tx provided in a stream. The network element comprises a processor and memory, wherein the memory contains instructions executable by the processor. The network element is operative to receive, from a client C1 during streaming of a segment V1, a request for media data of the stream, to provide, to said client C1, a segment V11 of a different length than said first length Tx, such that the segment V11 has a length, a starting point and an ending point, wherein the starting point is aligned to a time of said request and the ending point is aligned to a segment subsequent to V1, where the segment V11 comprise data not belonging to segment V1, and to provide, to said client C1 a segment, subsequent to segment V1, of said stream wherein the subsequent segment is a segment that the stream originally was divided in.

According to a third aspect of the embodiments, a computer program for enabling streaming of media data is provided. The media data is originally divided into segments of a first length Tx provided in a stream. Said computer program comprises code means which when run on a computer causes said computer to receive, from a client C1 during streaming of a segment V1, a request for media data of said stream, to provide to said client C1, a segment V11 of a different length than said first length Tx, such that the segment V11 has a length, a starting point and an ending point, wherein the starting point is aligned to a time of said request and the ending point is aligned to a segment subsequent to V1, where the segment V11 comprises data not belonging to segment V1 and to provide to said client C1 a segment, subsequent to segment V1, of said stream wherein the subsequent segment is a segment that the stream originally was divided in.

According to a fourth aspect of the embodiments, a computer program product is provided. The computer program product comprises computer readable code means and a computer program as defined above stored on said computer readable code means.

An advantage with the embodiments of the present invention is that user-to-user delay is reduced without introducing a zapping delay. Hence a synchronized viewing across many devices is obtained.

A further advantage with embodiments is that the length of the segment of a different length can be adapted to the requested joining time, since it does not matter if the first segment of a different length is created to be very short or very long since it is only the first segment that has a different length. I.e. the disadvantages associated with having e.g. shorter segments will not affect the present solution since; it is only the first segment that is shorter.

Yet another advantage is better cache usage since unnecessary parts can be thrown away earlier.

Another further advantage with embodiments is that the use of stored pre-encoded segments gives a faster and less complex solution that requires less processor capacity.

DETAILED DESCRIPTION

Thus, an object of the embodiments is to reduce the delay during channel change. There are different kinds of delays that can occur during streaming.

Figure 1A:
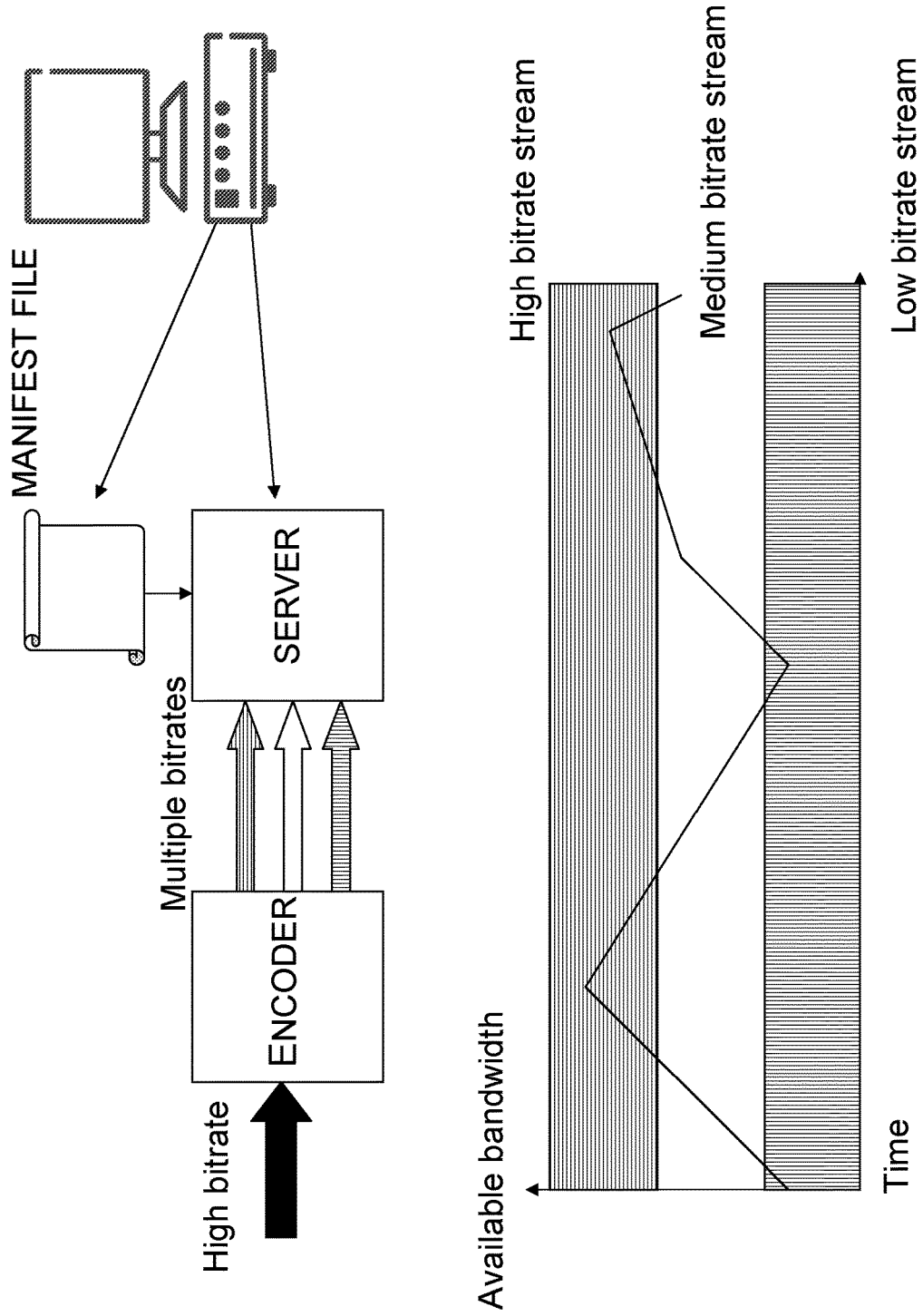
FIG. 1A illustrates adaptive bit rate streaming according to prior art.
Figure 1B:
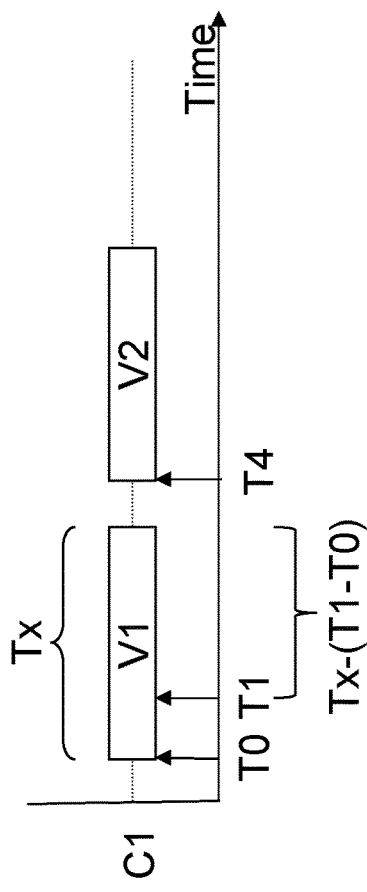
FIGS. 1B and 1C illustrate schematically the concepts of zapping delay and user-to-user delay.

In a first case, as illustrated in FIG. 1B, the server sends the segments of length Tx to the users synchronously, e.g. segment V1, 0-5 seconds, segment V2, 5-10 seconds. If a user C1 wants to join at T1=3.75 s, he has to await segment V2 at T4=5 s, in order to receive a key frame, since each segment normally contains one key frame in the beginning of each segment, i.e. a delay of 1.25 s. This example may be applicable for e.g. cable TV or media sent over internet. Hence the delay in this case relates to a zapping delay.

Figure 1C:
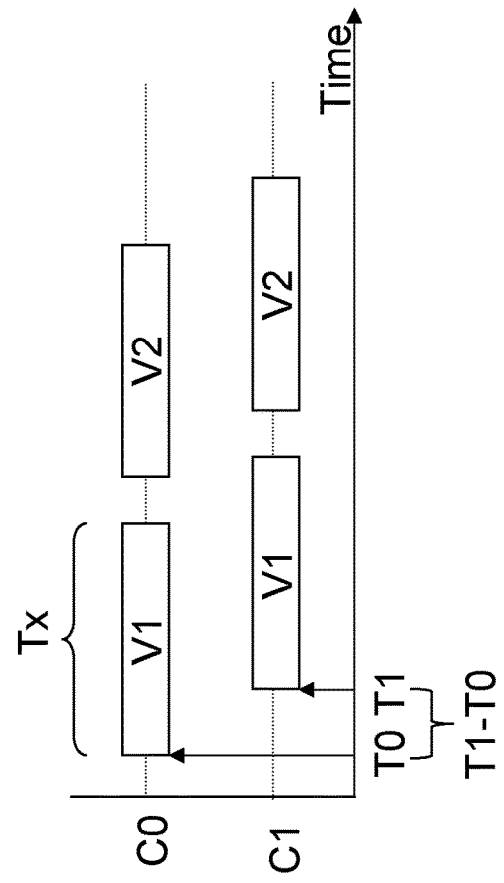

In a second case, as illustrated in FIG. 1C, there is a server providing the segments when a user requests them. This scenario may be applicable to when a user C0 wants to watch a movie and sends a request to the server and there is basically no delay since the server can start streaming the movie to the user as soon as the request is received at T0. I.e. user C0 receives a segment V1 at t=T0. Another user C1 can request the same move at another point of time T1, and the user will be provided the movie at the another point of time T1. I.e. user C1 will receive segment V1 at t=T1. There will of course be a delay between the users T1-T0 but that is no problem since they are watching the same movie independently of each other and the content of the movie is not live. The delay in this case relates to user-to user delay, but this delay is not relevant since the consumed content is not live content.

In a third case, the requested content is a live broadcast event, such as a football game. In this case it is important that the delay between the users is as small as possible. All users should be able to watch the same content at the same time. Using the example with a football game, you do not want to be in unsynch with family members watching on another device or your neighbors, watching the same football game so you can hear them screaming over a goal, when you will watch the goal 5 seconds later. If the solution in the example above would be used for the live content streaming a user-to-user delay would be introduced. Another possibility is to synchronize the segments as in the first case, that would however introduce a zapping delay of 1.25 seconds.

The object of the embodiments is to reduce the zapping delay while reducing the user-to-user delay. Accordingly, the embodiments are applicable to the third case in the context of streaming (multimedia such as video) and the scenario, when a user (client) wants to join a channel streamed as soon as possible. In this specification, the terms "user" and "client" are used interchangeably. The user receives the media stream via a network connected device (the client), e.g. a set-top-box, a smartphone, a television apparatus, a computer, a tablet PC, a notepad, or a multimedia player, which can display the stream on a built in or connected display and/or loudspeakers. Further it should be noted that the embodiments are applicable in the context of adaptive bitrate streaming, such as Dynamic Adaptive Streaming over HTTP (DASH) but adaptive bitrate streaming is not a requirement for the embodiments unless explicitly stated. It should further be noted that the embodiments are applicable also on other media streams than video, and therefore not limited to video.

Figure 2:
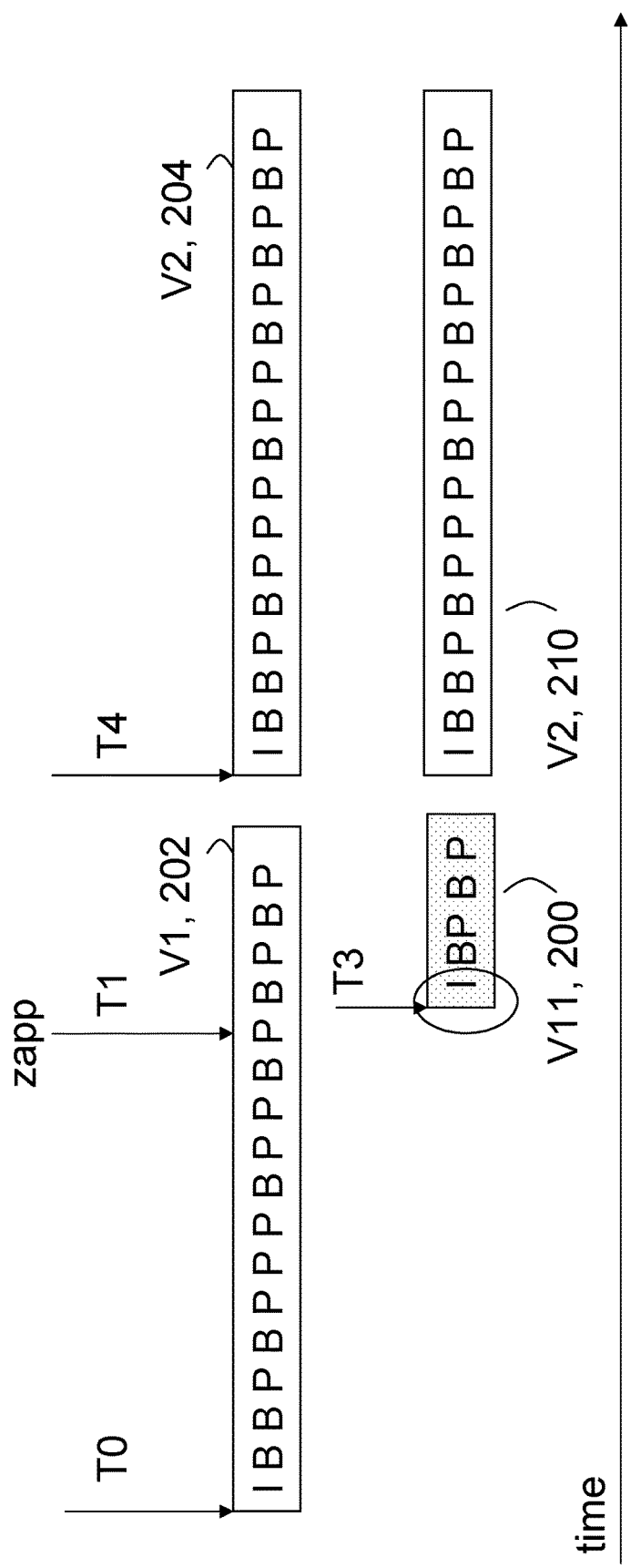
FIG. 2 illustrates schematically the segments being of a different length than the segment that the stream originally was divided in according to embodiments of the present invention.

As stated above, since each segment normally is between two to ten seconds comprising one key frame in the beginning of the segment, and the users can join (i.e. zap to) a specific channel at different time instants and each user has to await an I or S frame of the segment to be able to decode the segment, the user will suffer from a zapping time delay. Further, an example which is illustrated in FIG. 2, if a first user C0 joins the stream carrying media on channel A exactly when the most recent 10 seconds segment arrives (at T0) and a second user C2 joins the segment carrying media on channel A when it is only 2 seconds left before the next segment arrives (at T1), then the second user will have to start from the same place as the first user (T0), which implies that the second user will be 8 seconds behind and experience 8 seconds delay as long as he/she is watching channel A. This gap will never be recovered, implying a user-to-user delay of 8 seconds. It should be noted that it is also possible for the second user to await the next segment (if not http streaming), but that would mean that there would be a two second zapping delay, which also is undesired. Thus the users join a first segment V1 202 of the stream carrying media on channel A at T0 and when the first segment V1 202 is consumed, a second segment V2 204 of the same stream will be consumed accordingly.

According to embodiments of the present invention, the user-to-user delay and the zapping delay are reduced by a network element which is configured to provide at least one segment V11 200 that is of a different length than the actual segment V1 202 such that the segment V11 200 has a length, a starting point and an ending point, wherein the starting point is aligned to a time of when users request the media and the ending point is aligned to a segment subsequent to V1, and wherein the segment of a different length comprises data not belonging to actual segment V1 202. By letting the segment comprise data not belonging to the actual segment implies that the segment for example can be pre-produced and without any transcoding from the original stream which results in reduced complexity.

In this specification, the expressions "different length than the actual segment V11" and "different length than the segment that the stream originally was divided in" are used interchangeably, and are sometimes denoted as Tx. The expressions "different length" means that the segment V11 200 may be shorter or longer.

Figure 3:
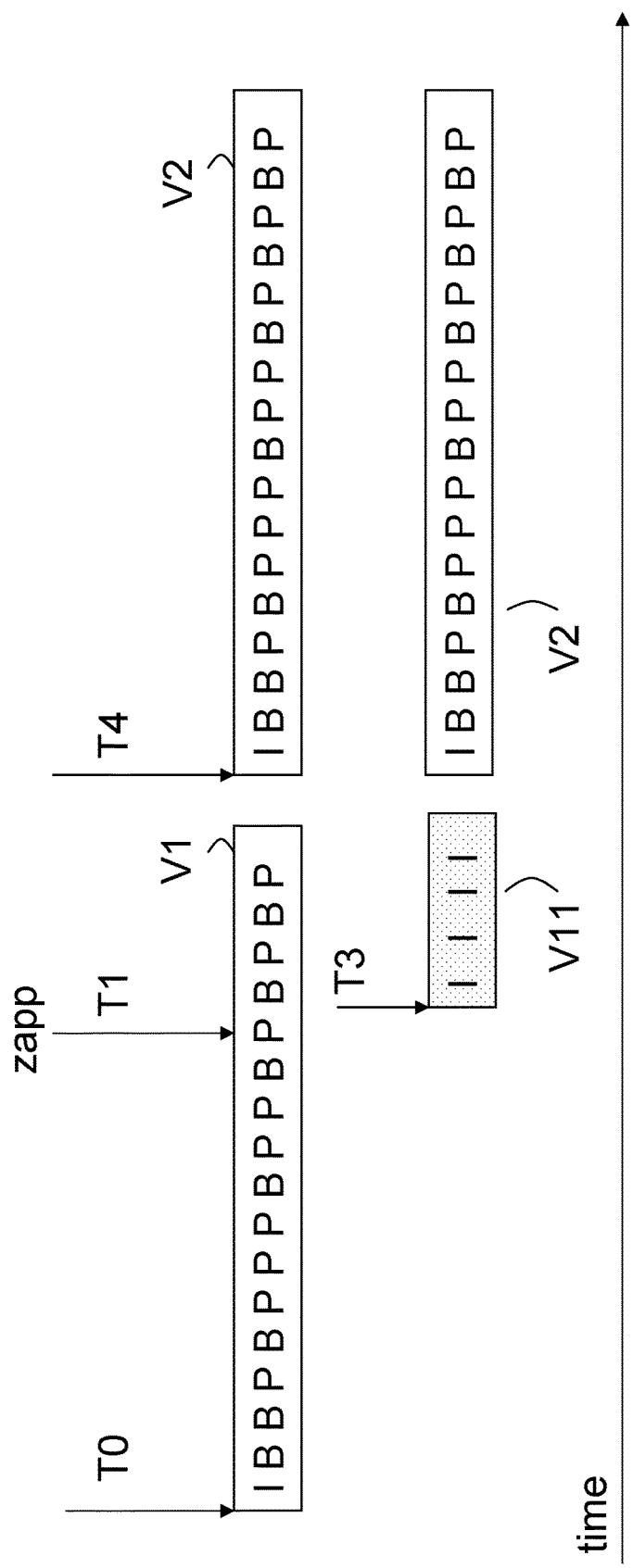
FIG. 3 illustrates schematically the segments being of a different length than the segment that the stream originally was divided in according to embodiments of the present invention.

The data of the segment of a different length V11 200 can be represented in different ways. Each segment should start with a self-contained key frame, but it is also possible that the data of the segment is represented by only self-contained key frames as illustrated in FIG. 3.

By providing the at least one segment comprising data not belonging to the actual segment and having a different length than the actual segment, wherein a key frame is inserted in the beginning of the segment, the delay, when zapping to a new channel, can be reduced, since a key frame will be accessible with a reduced time delay. Further the user-to-user delay is also reduced since the length of the first segment provided is adapted so that subsequent segments of the stream are sent to the users as substantially the same time. Referring to FIG. 2, it is illustrated that the second user could be provided with a segment V11 200 having a different length than the actual segment V1 202, in this example a shorter length, and comprising data no belonging to segment V1. In this way the second user could join at the time instant denoted T3 instead of T0 or T4, which results in a user-to-user delay of zero. When the data in the segment V11 200 having a different length than the actual segment is consumed the second user can then join the next actual segment V2 210 which is part of the stream of segments that the stream originally was divided in. By introducing the segment having a different length, the possibility to join the next actual segment V2 (210) which is part of the stream of segments that the stream originally was divided in at the substantially same time as other users is provided, which makes it possible to reduce the user-to-user delay, since all users will substantially be in synch with the original stream.

In this way, the segment V1 202 being streamed at the time of the at the zap, i.e. when the user request to join the stream, is replaced with a segment of a different length V11 200, comprising data not belonging to the segment V1 (20), starting with a key frame such that the key frame is accessible at the joining point, which results in both a reduced zapping time delay and a reduced user-to-user delay.

Figure 4A:
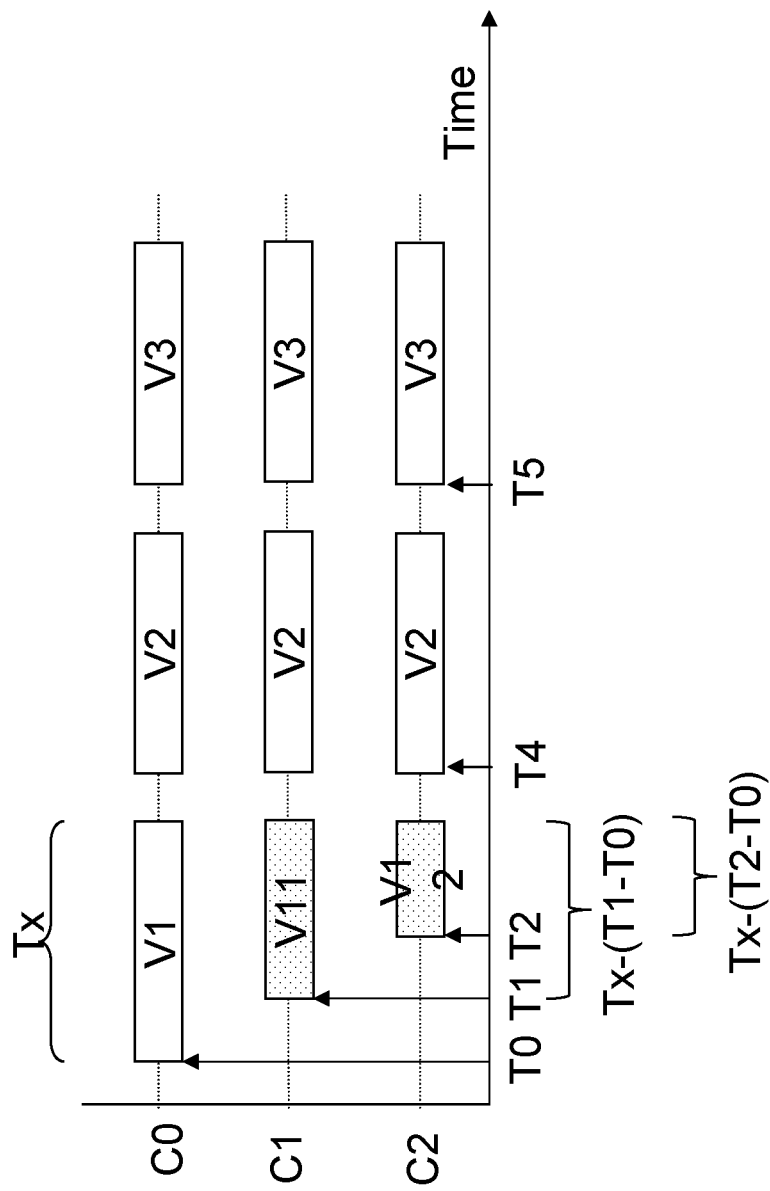
FIGS. 4A and 4B illustrate how the segments being of a different length than the segment that the stream originally was divided in can be created according to embodiments of the present invention.

According to embodiments as illustrated in FIG. 4A a user C0 joins the stream carrying media divided into segments of the length Tx exactly when the most recent segment V1 arrives (at T0) and a second user C1 may join the stream at a later time T1, and a third client C2 may join at a later time T2. To reduce the user-to-user delay and the zapping delay a network element provides to client C1 a segment of a different length V11 and to client C2 a segment of a different length V12. In this example the segments of different length are shorter than the said length Tx. The network element then provides to all clients C0, C1, and C2 a subsequent segment V2 at substantially the same time.

According to embodiments the segment of a different length described above comprise data not belonging to said segment V1. Examples of data not belonging to the segment V1 is exemplified below.

In embodiments the network element may provide segments with different data depending on one or a combination of criteria, such as date and time of day, which program is streamed, localization, known data about the user etc. The network element may have got instructions on how to select which segment based on these criteria.

In embodiments the capability to provide different segments allows to customize data to the user, and/or to prohibit that a user always gets the same data.

In one embodiment the data of the segments of a different length represents a video sequence.

In one embodiment the data of the segments of a different length represents an audio sequence.

In one embodiment the data of the segments of a different length represents a still image.

In another embodiment the data of the segments of a different length represents a black screen image The content (data) of the segment of a different length may be e.g. a commercial, information about the channel, or information about the streamed program.

When the provided segments of a different length contains commercials or advertisement, the network element may provide statistics/data on the type and amount of such segments it has provided. The statistics/data may also have details on when said segments were provided, and to whom. This statistics can then be used to provide feedback on how many clients that have seen e.g. the commercials, and be a basis for charging.

There are different ways to create the segment having a different length than the actual segment and some are exemplified below and in FIG. 4B, FIG. 5A, FIG. 5B, and FIG. 5C.

According to embodiments the segments of a different length containing data not belonging to the actual segment may be created on demand by the network element.

When providing the segments of a different length V11 the network element adapts the provided segments to the stream that the client has requested. Parameters used may be the encoding, codec, type of container, lowest bitrate, length, and width and height.

In all examples 400 to 440 below, the provided segment of a different length V11 200 is created from a one or several separate/parallel stream(s) different from the requested stream and containing the media to be used for the first segment e.g. when zapping. Each segment in the stream starts with a self-contained key frame and may comprise P- and B-frames, or consist of only key frames. The length of the segments in these streams may be of the same length as the actual segment V11 202, but may also be longer or shorter.

400: According to one example, the segment containing data not belonging to the actual segment V1 is cut off to a shorter segment. Since the segment is cut off in the beginning, also the shorter segment will start with a self-contained key frame. It is also possible that the segment is retrieved from a pure key frame stream, i.e. a stream only comprising key frames. Such a pure key frame stream can be constructed by an encoder

410: According to another example, the segment is cut off in the end to a shorter segment and a key frame is inserted in the beginning of the shorter segment. In this embodiment, the key frame to be inserted is retrieved from a pure key frame stream, i.e. a stream only comprising key frames. Such a pure key frame stream can be constructed by an encoder. That implies that the encoder receives the media data to be encoded and in addition to the conventional encoding of the media, a pure key frame stream is also provided.

420: According to yet a further example, the segment is cut off where the user wants to join and a new key frame is inserted in the beginning of the shorter segment as in the embodiment described above and referred to as 410 but the new key frame is calculated based on the data contained in the part of the segment that was cut off.

430: According to another example the segment is decoded and encoded again to a shorter segment starting with a key frame.

440: In another example a segment having a different length is provided, wherein the segment contains only key frames as illustrated in FIG. 3. The key frames can either be retrieved by re encoding the actual segment to a segment having a different length containing only key frames, or the key frames can be retrieved from a key frame stream comprising only key frames.

The manifest file can also be changed. The client can then determine from the manifest file that there is only one segment that is having a different length and starts with e.g. 150 frames, followed by segments that are longer e.g. 600 frames.

Figure 5A:
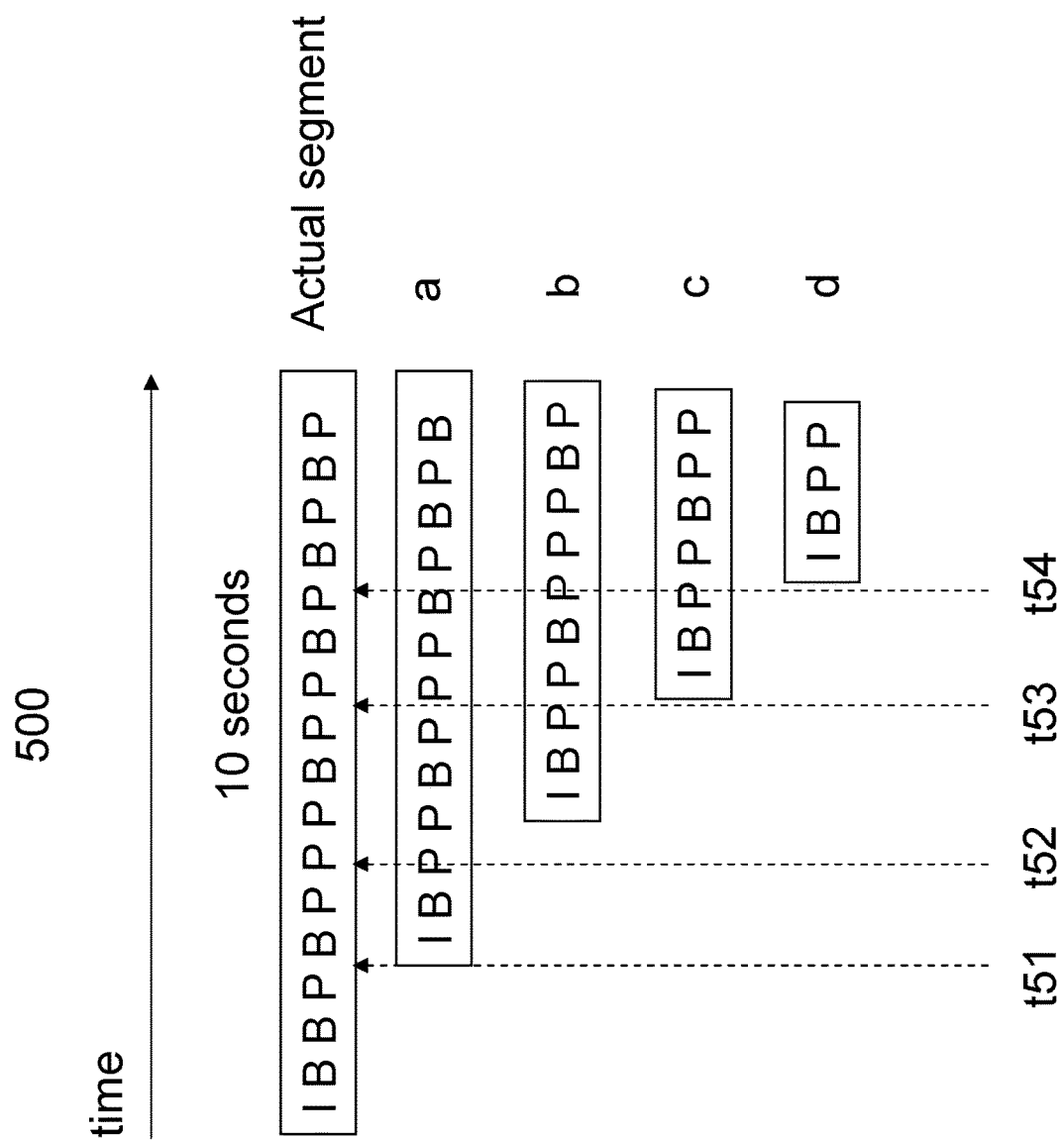
FIGS. 5A-5C illustrate schematically embodiments of the present invention where multiple segments of a different length are provided.

500: According to further embodiment, as illustrated in FIG. 5a, the provided segment having a different length V11 200 is taken from one of several separate/parallel streams containing the media comprising data not being part of the requested stream, to be used for the first segment e.g. when zapping, where each stream contains segments of different length s. The network element then provides a segment from the stream where the segments has a length that corresponds to the time remaining of the currently streamed segment V1 of the requested stream. Each segment in the stream start with a self-contained key frame and may comprise non self-contained such as P- and B-frames, or consist of only key frames.

The separate/parallel streams in the examples above may comprise segments that represents video sequences, still images, black screen images, or audio. The content of the segment having a different length may be e.g. a commercial, information about the channel, information about the streamed program, or another set of information or entertainment.

Figure 5B:
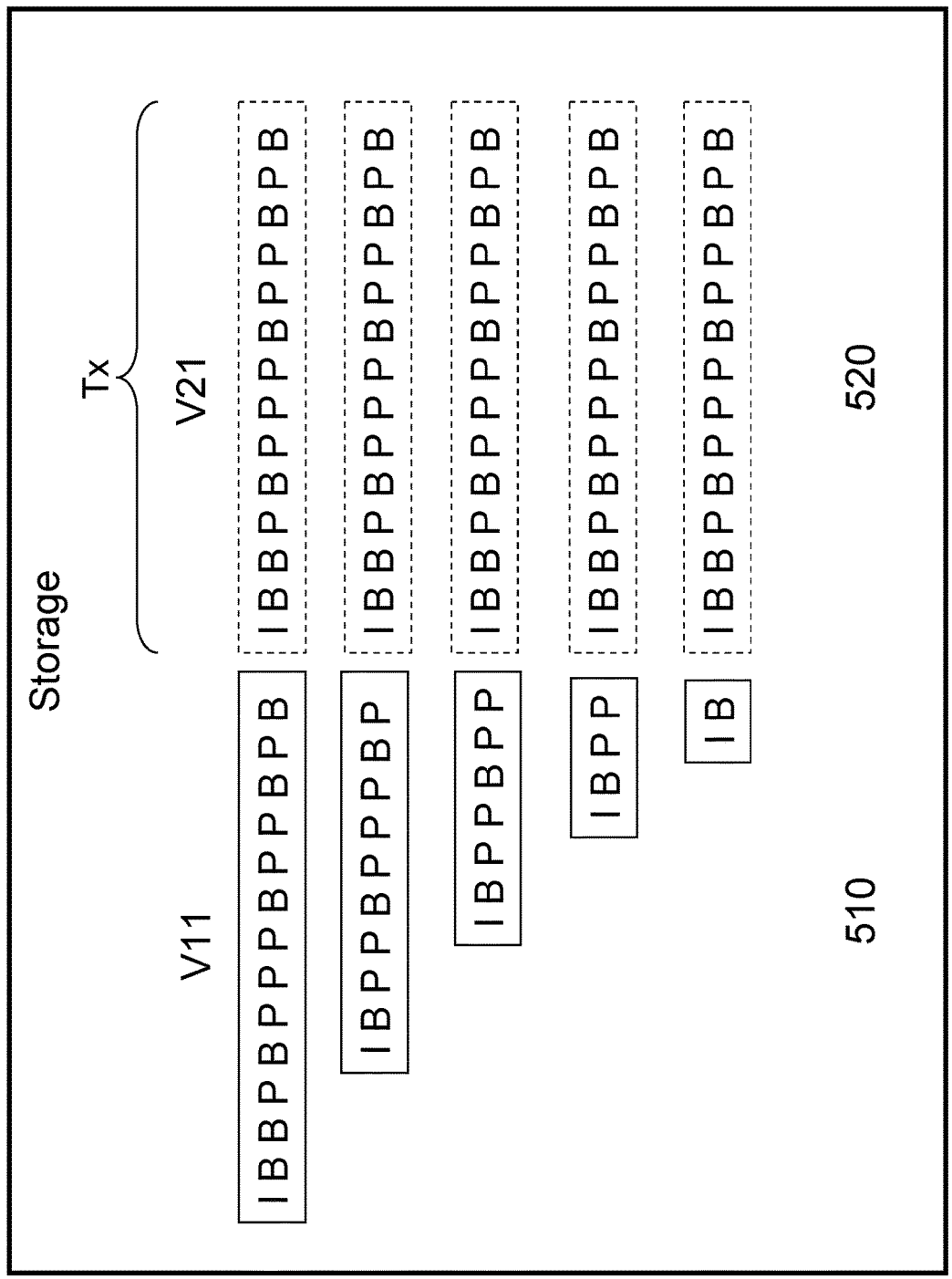

According to another embodiment the provided segment having a different length is a representation of a video sequence, still image, black screen imager, or audio and wherein the segment is constructed by an encoder 510: According to further embodiments the network element may provide the segments V11 200 that is of a different length than the actual segment V1 202 such that the segment V11 200 has a length, a starting point and an ending point, wherein the starting point is aligned to a time of when users request the media and the ending point is aligned to a segment subsequent to V1 202, comprising other data not belonging to the requested stream, from a storage which may comprise pre-encoded segments of various content, length s and encodings, as schematically illustrated in FIG. 5B. Each segment in the storage starts with a self-contained key frame and may comprise P- and B-frames, or consist of only key frames. In this example the segments having a different length are shorter than the length of the actual segment V1 201.

Figure 16:
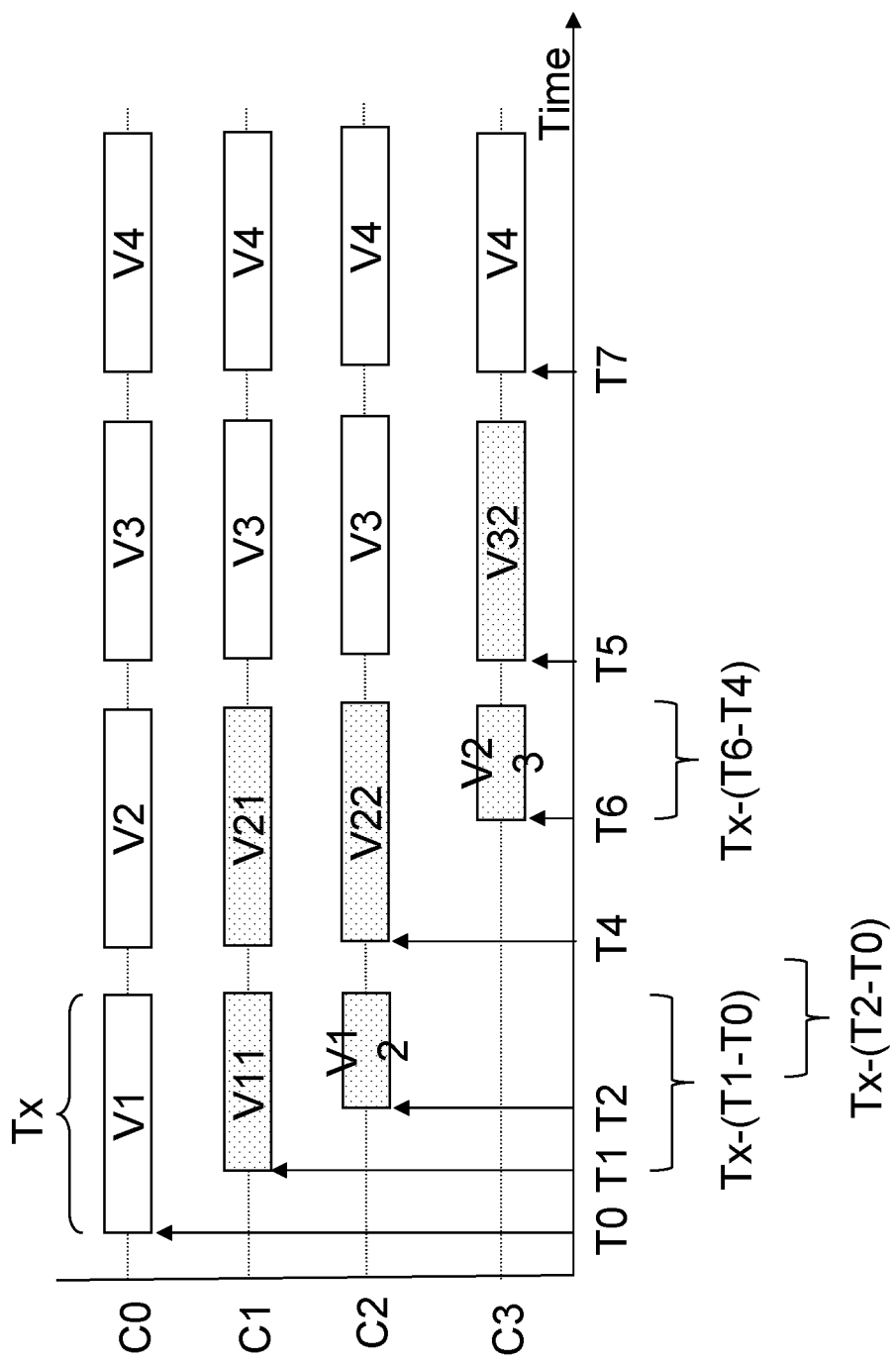
FIG. 16 illustrates schematically embodiments where the segment being of a different length than the segment was originally divided in is followed by further subsequent segments before a subsequent segment from the stream is provided.

520: In a further embodiment the network element may provide not only a single segment having a different length V11, but a set of segments before starting to provide the requested stream to the client. As illustrated in FIG. 5B and FIG. 16, there may be stored sets with one segment having a different length V11 and one or more subsequent segments with the length Tx. In FIG. 5B illustrated with one subsequent segment V21. If for example Tx=10 seconds and a client C1 request the stream at T1=8 seconds, the network element provides first a shorter segment V11 with the length 2 seconds and then segment V21 with the length Tx=10 seconds before starting to stream segment V3 from the requested stream at time T5, which may be substantially the same time as V3 is streamed to other clients. In other embodiments there are more subsequent segments stored and provided. If for example two subsequent segments V21 and V31 are provided, then a segment V4 will be streamed to clients at substantially the same time.

Figure 5C:
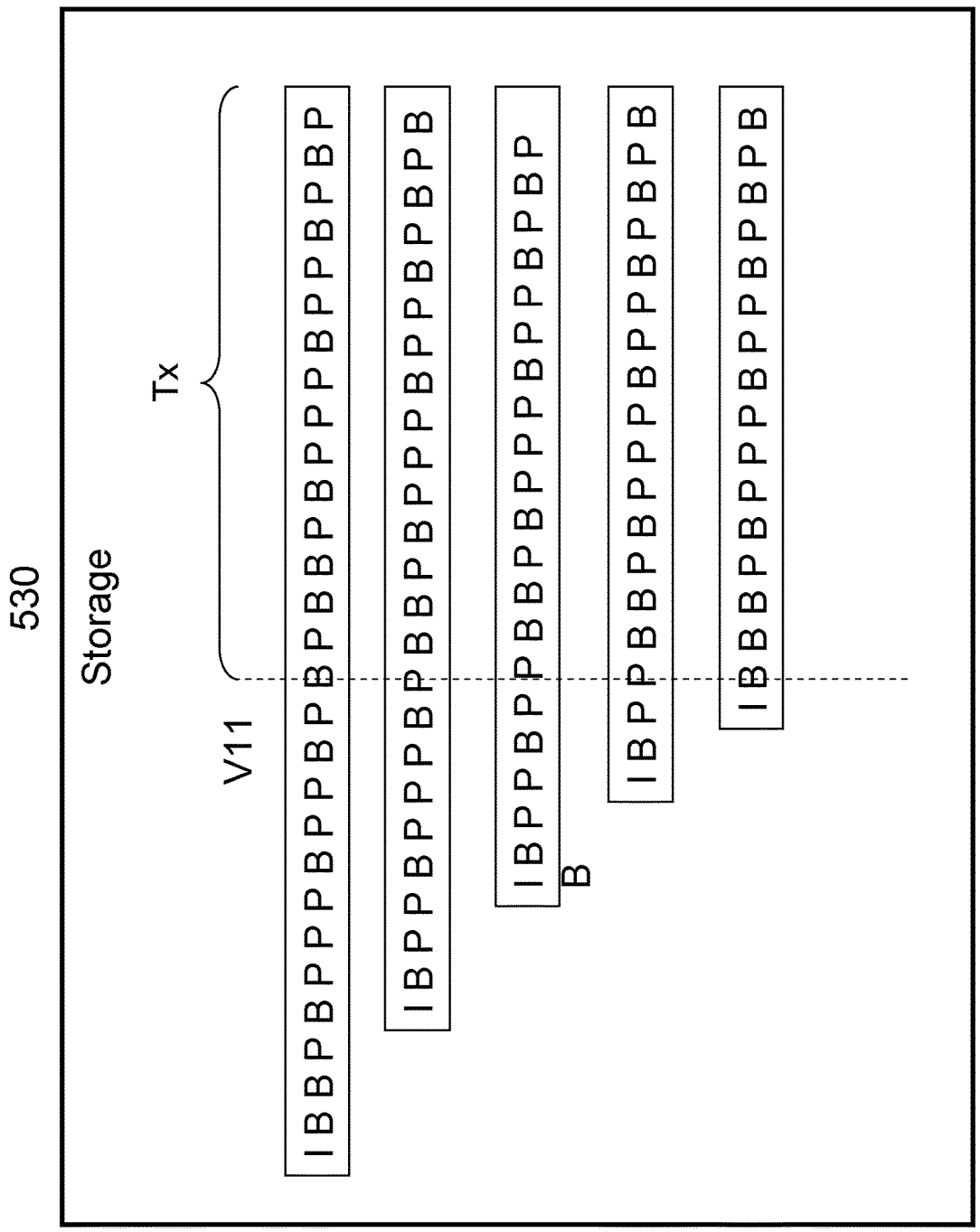
Figure 17:
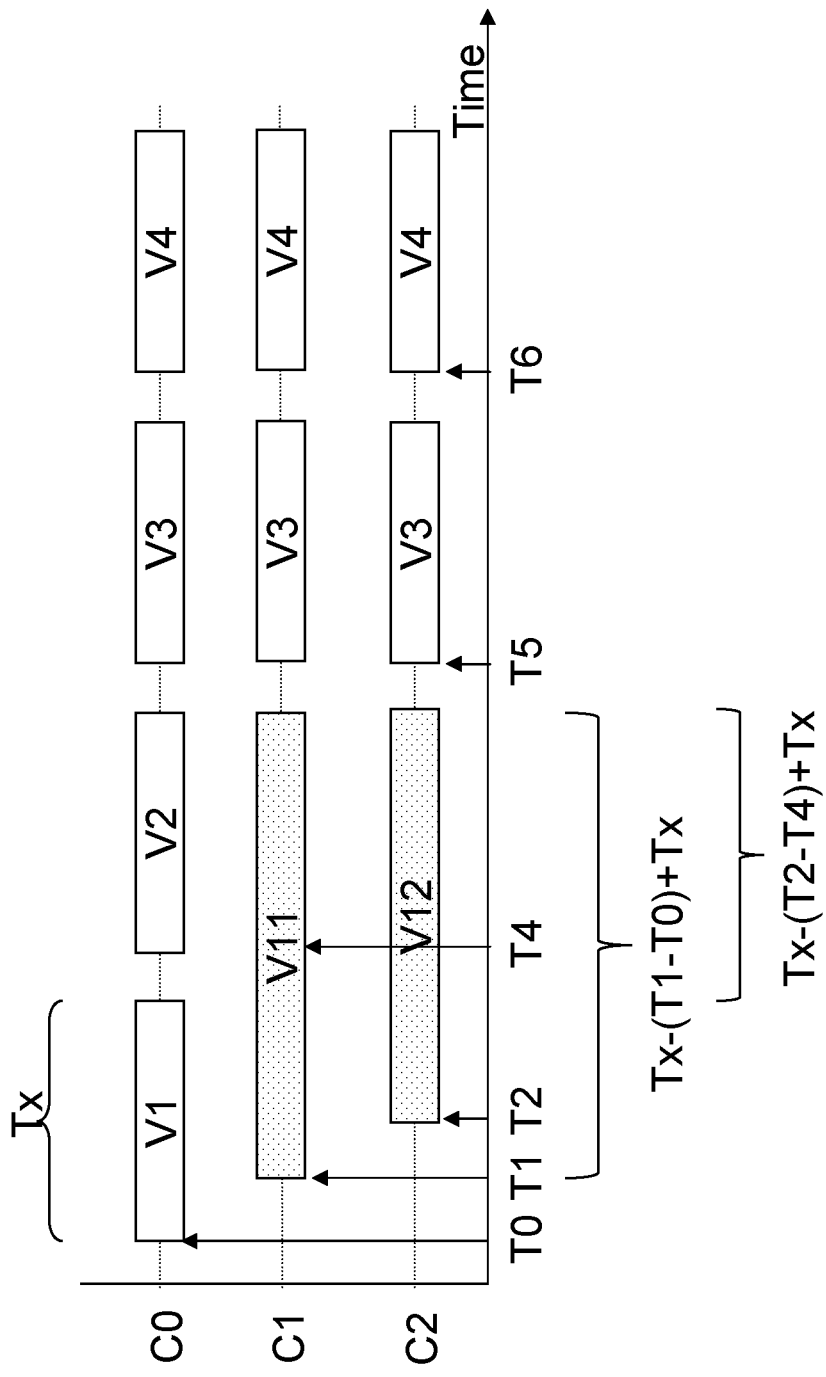
FIG. 17 illustrates schematically the segments being longer than the segment that the stream originally was divided in according to embodiments of the present invention.

530: In a further embodiment the network element is not limited to provide shorter segments, but also longer segments. As illustrated in FIG. 5C and FIG. 17 the storage comprise segments longer than the length of the segments the requested stream is divided in. If for example a client C1 request the stream at T1=8 seconds the network element may provide a segment V11 of e.g. the length 12 seconds and starts streaming segment V3 from the requested stream at time T5, which may be substantially the same time as V3 is streamed to other clients.

The examples 520 and 530 allow providing longer sequences which may give more flexibility in which content that can be used. A commercial with e.g. the length 12, 22, or 32 seconds may be more attractive than a commercial with the length 2 seconds. To allow the streaming to be in synch with other users, the length of the longer segment in 530 or the set of segments in 520 may be a multiple of Tx+the remaining time of the requested segment at the time of the request, i.e $(Tx-(T1-T0))+n*Tx$ where n is zero or an integer.

The segments may be stored into the storage in various ways, including but not limited to remote storage via the network or via media such as DVD, CD-ROM, hard disk or USB.

Having pre-encoded segments has the benefit of speed and less complexity, as the segments do not have to be created on the fly. Another benefit is reduced CPU requirements.

The segments stored may be replaced by a command where new data is sent out, for example when a new program is started to be transmitted. There may also be several segments or set of segments with the same length but different content stored, and the network element may select which of these to use based on command or one or several criteria such as date and time of day, which program is streamed, localization, known data about the user, length of segment etc.

As there cannot be unlimited numbers of segments in various length s stored, it will differ a time interval between them. Let's say that we have selected to store segments with the interval 1 second, i.e. we have stored segments that have the length s 0 s; 1 s; 2 s; 3 s; 4 s; 5 s; 6 s; 7 s; 8 s etc. If for example Tx is 10 seconds and client C1 makes a request 3.5 seconds after Client C0 made the request at T0 and got the stream, then the length of V11 has to be 6 or 7 seconds. Thus client C1 will be 0.5 seconds out of sync with client C0. Thus client C1 and C0 will request subsequent segment V2 with a half time interval (0.5 s) difference. In further embodiments the network element can delay sending the subsequent segment V2 so that it is sent to all clients at the same time.

The stored segments in the examples above may comprise segments that represents video sequences, still images, black screen images, or audio. The content of the segments may be e.g. a commercial, information about the channel, information about the streamed program, or another set of information or entertainment.

According to another embodiment the provided segment(s) is a representation of a video sequence, still image, black screen imager, or audio and wherein the segment(s) is constructed by an encoder An example how to determine the length of the segments having a different length than the actual segment is described below:

Assume that all clients are synchronized. That means that all clients will start downloading the first segment at time T0 in FIG. 2, and all clients will start downloading the second segment at T4. If you are a new user that joins between T0 and T4, you want to start downloading a segment that is exactly so long (in terms of frames) that, when you are finished downloading it and it is time to start downloading the second segment, time equals T4.

One way to calculate this is the following: It is now time T3 (say T3=7.5 seconds). All clients will start downloading segment 2 at time T4=10 seconds. There is 10−7.5=2.5 seconds left. If the media data clip has a frame rate of 60 frames per second, the media data clip should consist of 60*2.5=150 frames, or (T4−T3)*fps (frames per seconds) in general.

In FIG. 4A the calculation would mean that the segment V11 should get the length Tx−(T1−T0)=10−(7.5−0)=2.5 seconds.

Note that it may be advantageous to allow some margin in either direction.

Figure 6:
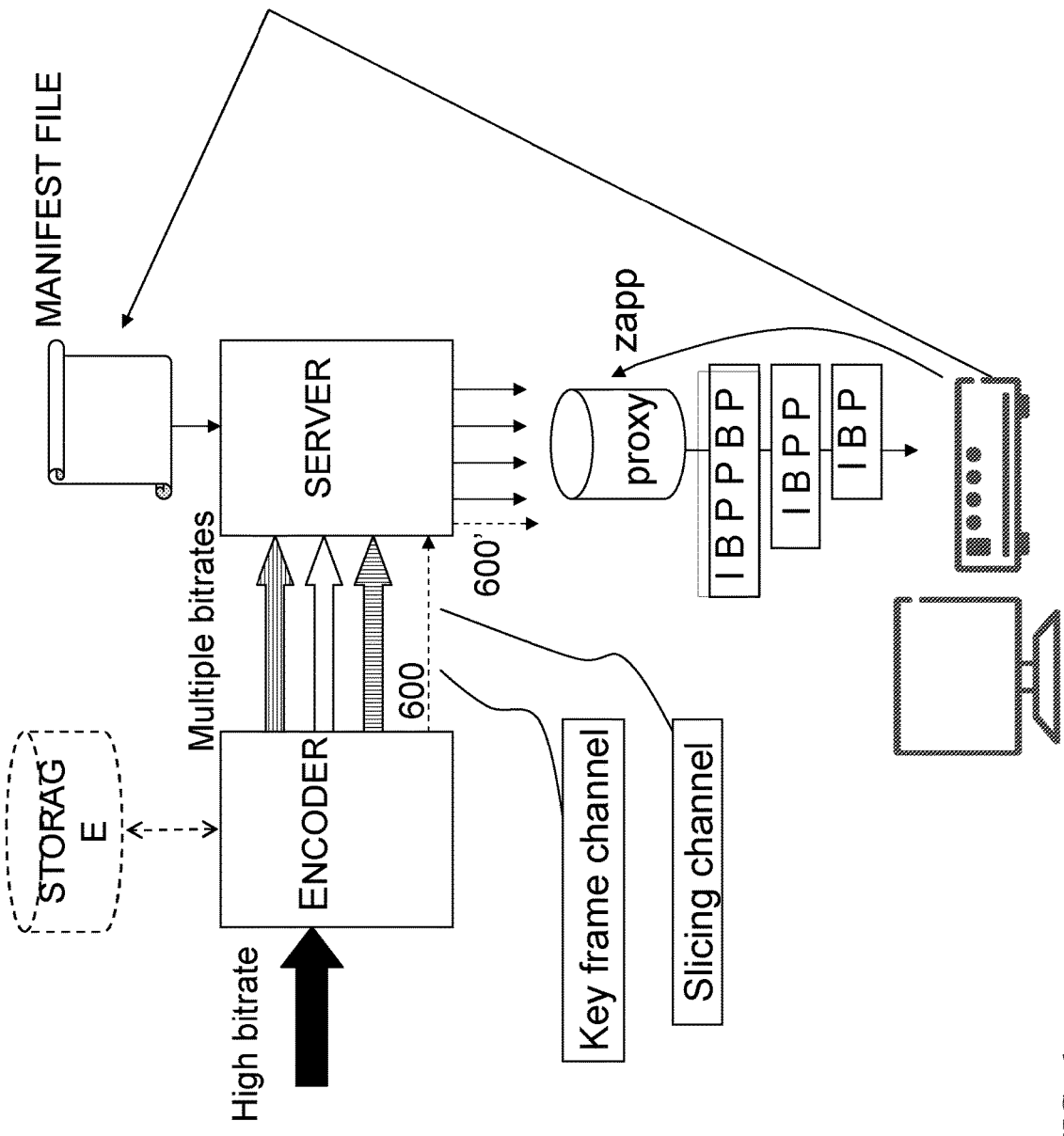
FIG. 6 illustrates schematically one embodiment of the present invention.

The segments having a different length can either be created by the encoder (FIG. 7) or by a proxy associated with the web server (FIG. 6). The proxy can also be a part of the web server. If the segments having a different length are created by the proxy, and if the key frame stream or a slicing stream (explained below) is used, the key stream or the slicing stream has to be provided by the encoder to the proxy.

Instead of providing a segment having a different length that is adapted for the joining point, multiple versions of segments having a different length than the actual segment can be provided as illustrated in FIG. 5A. These multiple segments have different lengths and when a user joins a new channel, the segment that gives the shortest delay should be provided by the proxy to the user. For example, a user who wants to join at t52 in FIG. 5A, would have to join the stream at t51 to get the best user experience in terms of user-to-user delay, since the user-to-user delay would be zero while the zapping delay would be 52−t51. The multiple segments having a different length can be created according to any of the examples 400, 410, 420, 430, 440, 500, described above, or fetched from a storage according to any of the examples 510, 520, 530 described above.

These segments having a different length can either be provided by the encoder or a proxy associated with the web server. In FIG. 6, the proxy is located after the web server and the proxy creates the segments having a different length. In order to alleviate for the proxy to create the segments having a different length, the encoder can provide the proxy with a key frames stream or alternatively a slicing stream, said streams containing the media comprising data not being part of the requested stream, to be used for the first segment e.g. when zapping. The key frames stream comprises only key frames, e.g. I frames, and the slicing stream is a stream that is specifically adapted to be divided into segments having a different length. I.e. in the slicing stream the self-contained key frames are created such that they imitate a non-self-contained frame pixel by pixel. The key frame stream comprises self-contained key frames which not necessarily has a clear corresponding non self-contained frame.

The encoder creates the key frames stream and the slicing streams, respectively, by encoding the data to the key frames stream or the slicing stream. The slicing stream can, but is not limited to, be created by simply replacing one of the P-frames with an S-frame. The S-frame contains (almost exactly) the same pixels as the P-frame, so the following P and B frame can use the S-frame instead of the P-frame. The S-frame is self-contained, so the entire IBBPBBPBBPBBP-sequence does not have to be sent. As an example, the frame marked with I+ in 410 in FIG. 4B could be an S-frame. It is an I-frame that just encodes the same pixels as the P-frame it replaces.

Figure 4B:
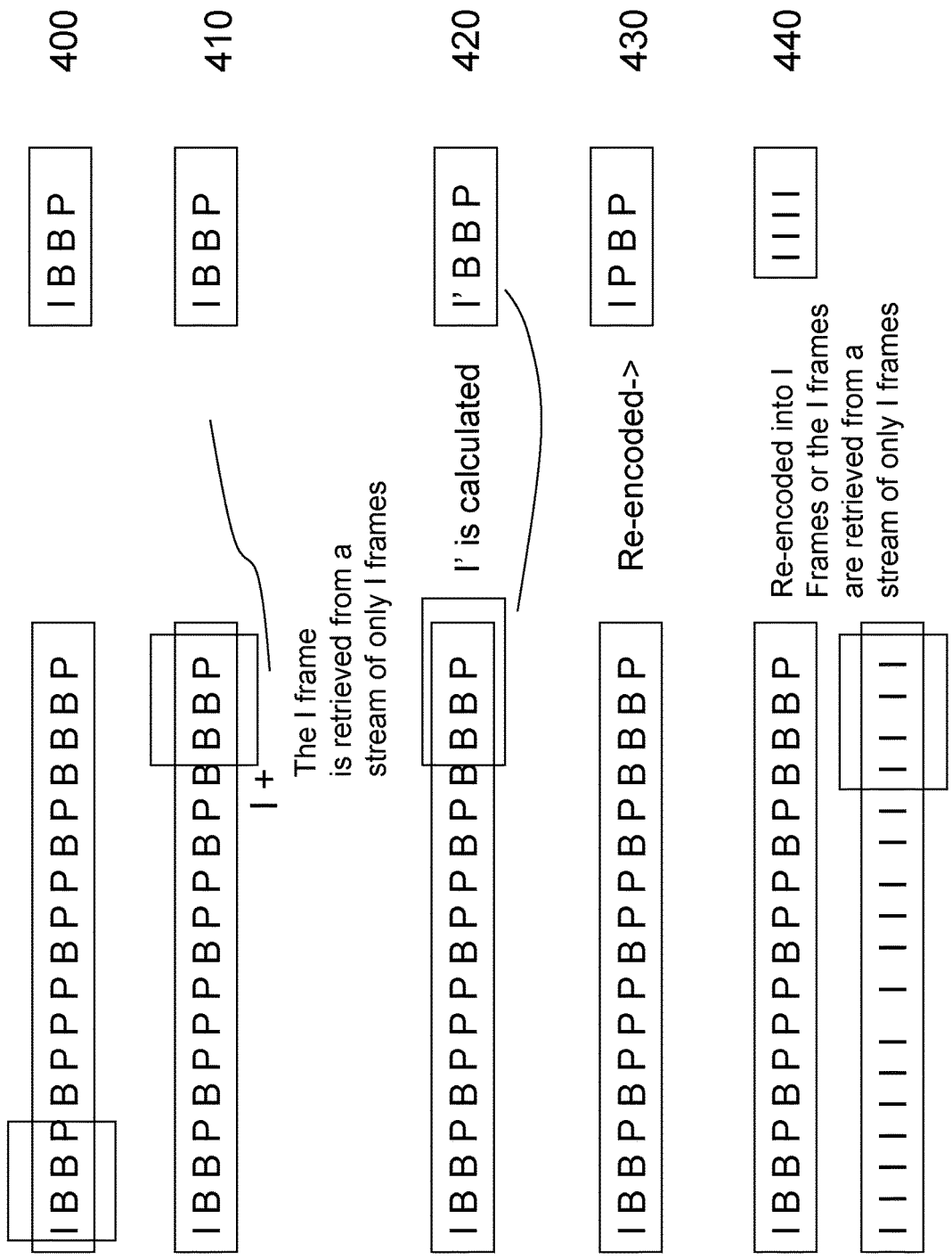

As another example, the proxy comprises a transcoder and re-encodes the actual segments of the stream that is used to create the segment having a different length, to one or more segment having a different length than the segment that the stream originally was divided in as explained in 430 of FIG. 4B.

In the example of FIG. 6, the encoder sends multiple adaptive bit rate streams and possibly also the key frames stream or the slicing stream. The web server receives the streams from the encoder and forwards them to the proxy. The proxy creates multiple segments having a different length of the segment of one of the adaptive bit rate streams containing the media comprising data not being part of the requested stream, to be used for the first segment, e.g. the adaptive bit rate stream with the lowest possible bit rate adapted for the client. If the key frames stream is provided, the key frames from this stream can be used for creating the segments having a different length. If the slicing stream is provided, the slicing stream can be used to create the segments having a different length.

The web server may not know what happens in the proxy, it just provides regular segments to the proxy. The proxy then produces new segments, having a different length, when needed as explained above. Another possibility is that the web server has already pre-calculated all the possible segments having a different length that the proxy could ever need to produce. In this case the proxy would ask the web server for these segments having a different length. An advantage with this solution is that the proxy does not require a transcoder.

Figure 7:
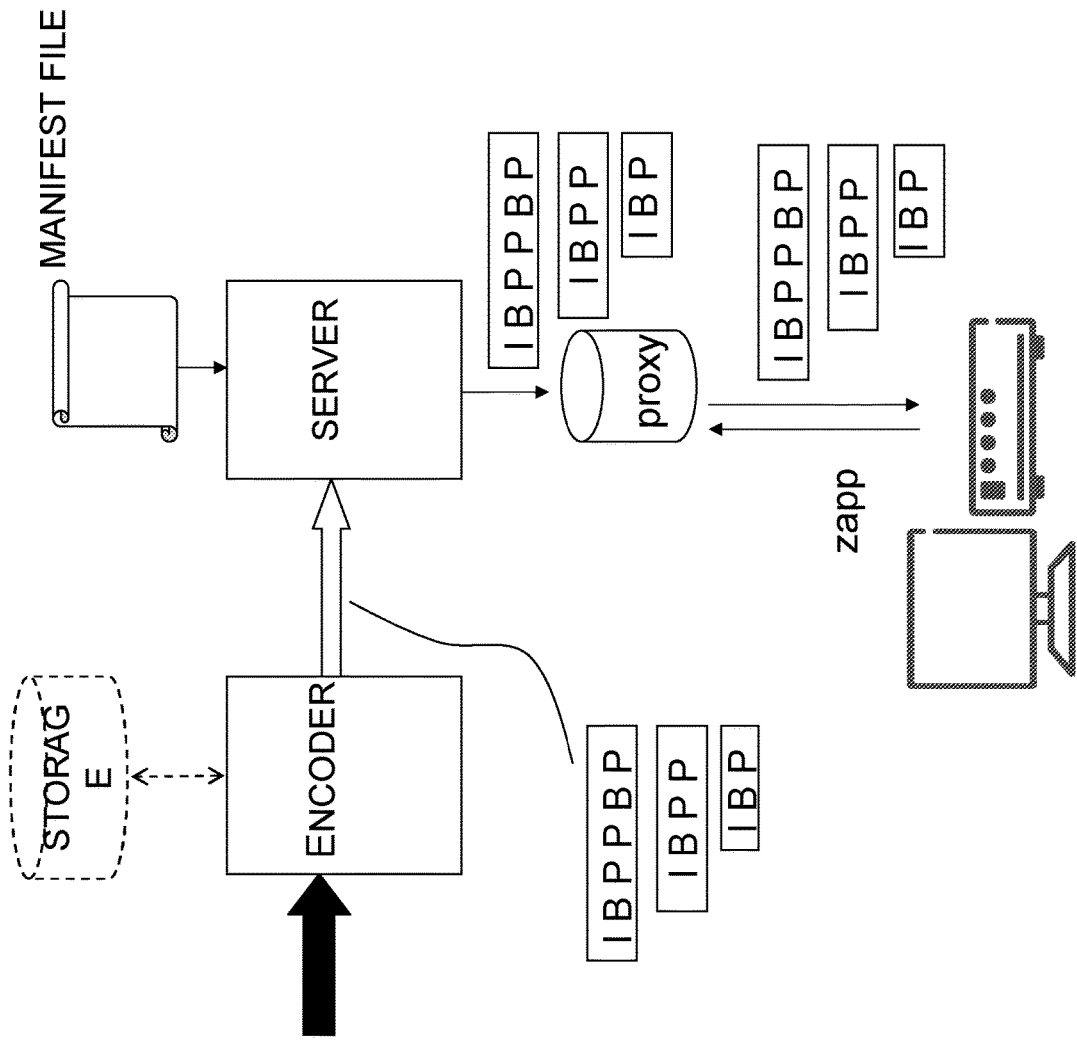
FIG. 7 illustrates schematically one embodiment of the present invention.

In an alternative embodiment illustrated in FIG. 7, the encoder creates the segments having a different length, e.g. by re-encode the replacement segments not being part of the original requested stream, e.g. commercials, information, still images, audio, etc., to segments having a different length or according to another method as explained in conjunction with FIG. 4. Hence the encoder is configured to encode a stream with segments having a different length, e.g. with a lowest possible bit rate adapted for the client in addition to e.g. the multiple adaptive bit rate streams.

In the case of adaptive bitrate streaming, it should be noted that it is also possible to create multiple segments having a different length with different bitrates by either the encoder or the proxy.

Figure 8:
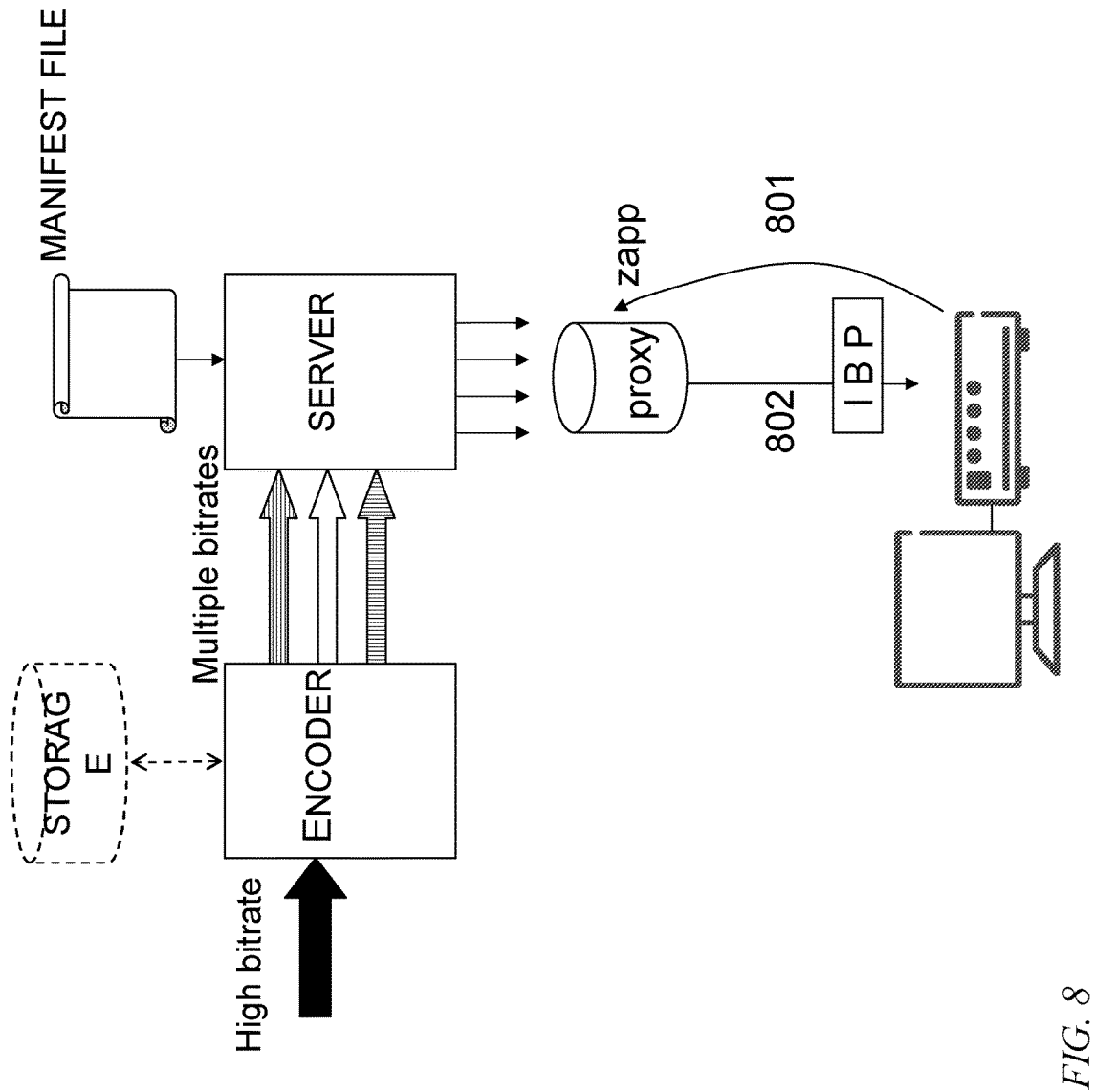
FIG. 8 illustrates schematically one embodiment of the present invention.

Turning to FIG. 8, showing an additional example of one embodiment of the present invention. The user watching a channel A wants to change to channel B, the device the user is using to retrieve the media stream, such as a set-top box, signals to the proxy/server that the user wants to join channel B 801. When the proxy/server receives the channel change request of channel B, it provides 802 a segment having a different length, or a set of segments, comprising data not belonging to the actual segment in channel B according to one of the alternatives described above and illustrated in FIG. 4B and when the segment(s) is consumed, it provides a subsequent segment that the stream originally was divided in.

Figure 9:
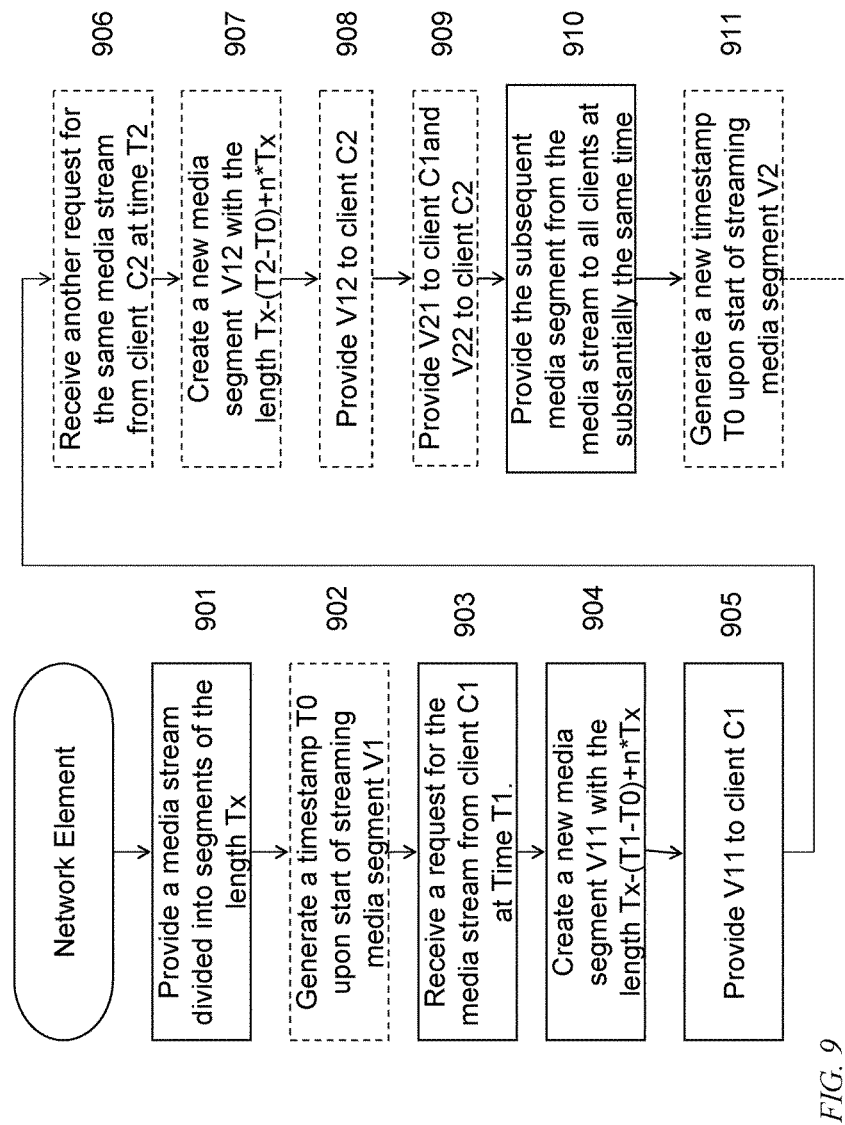
FIGS. 9-12 are flowcharts illustrating a method according to embodiments of the present invention.

As illustrated in FIG. 9, a method to be performed by a network element for enabling streaming of media data such as video data is provided. The media data is originally divided into segments of a first length provided in a stream 901 and the media data is represented by non self-contained frames and self-contained key frames in the segments. The non self-contained frames can be P- and B-frames but can also relate to any other frames that require additional information to be decodable. The self-contained key frames relates to any frames that can be decoded independently of other frames, such as I frames. A key frame is always self-contained.

The network element may upon start of streaming a media segment V1 of the original stream generate 902 a timestamp T0, and may further generate a new timestamp T0 upon start of each media segment in the original stream.

The network element receives 903, from a client C1, a request for media data of a stream and the network element provides 905, to the client, a segment different from the requested stream, wherein the segment has a different length than the segment that the stream originally was divided in and a first frame of the provided segment is a self-contained key frame. When the segment having a different length is consumed, it provides 910 a subsequent segment that the stream originally was divided in. In this way both the zapping delay and the user-to-user delay is reduced.

In some embodiments the network element may receive 906 another request for the same media stream from a client C2 at a later time but still while streaming segment V1, The network element then creates 907 a new segment different from the requested stream, wherein the segment has a different length than the segment that the stream originally was divided in. When the segment having a different length is consumed, it provides 910 to all users at substantially the same time a subsequent segment that the stream originally was divided in. In this way both the zapping delay and the user-to-user delay is reduced.

In one embodiment, the segment having a different length than the segment that the stream originally was divided in only comprises self-contained key frames as illustrated in FIG. 3.

As mentioned above, a length of the segment having a different length than the segment that the stream originally was divided in is adapted to a time when the client wants to join the requested stream in order to minimize the time delay when changing to a new channel.

Figure 10:
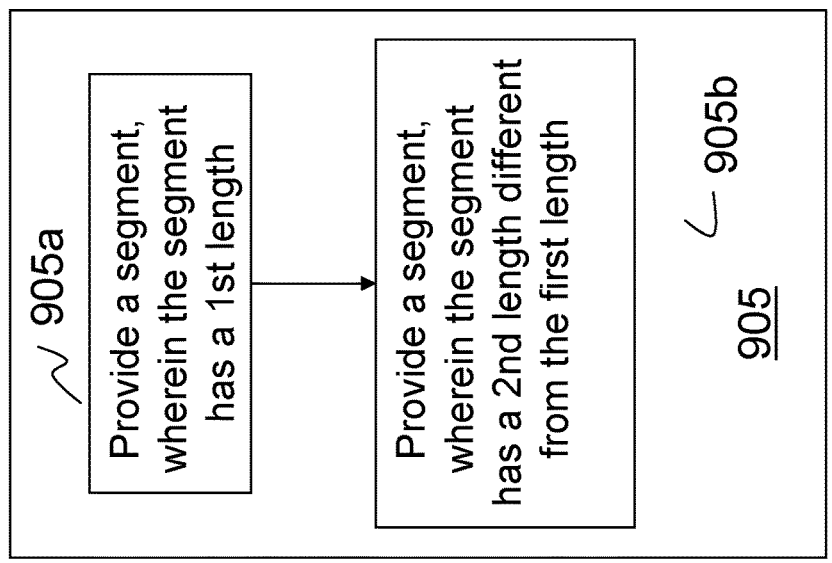

As illustrated in FIG. 5A and FIG. 10, the providing step 905 may further comprise providing 905a, to the client, a segment different from the requested stream, wherein the segment has a first length and is having a different length than the segment that the stream originally was divided in and a first frame of the provided segment is a self-contained key frame, and providing 905b, to the client, a segment of the requested stream, wherein the segment has a second length different from the first length and is having a different length than the segment that the stream originally was divided in and a first frame of the provided segment is a self-contained key frame.

In a further embodiment, the provided segment(s), having a different length than the segment that the stream originally was divided in, may be provided in different bit rates. However, if the segment having a different length is provided in one bitrate, that bitrate may be a low bitrate.

In some embodiments, the network element creates 904 the segment having a different length than the segment that the stream originally was divided in. That can be performed by cutting off frames from a segment of another stream that is intended to use for replacement of the first frame when zapping. The frames can be cut off in the end (400) or in the front (410, 420). If the end of the segment is being used as the segment having a different length, the network element may insert a new self-contained key frame in the beginning of the segment having a different length than the segment that the stream originally was divided in. This is illustrated in FIG. 11 and FIG. 4.

As illustrated in FIG. 4 (440), according to one embodiment the new self-contained key frame is created by calculating the new key frame based on frames being cut off. The new self-contained key frame can also be created by retrieving a key frame from a stream of segments comprising only key frames.

Figure 11:
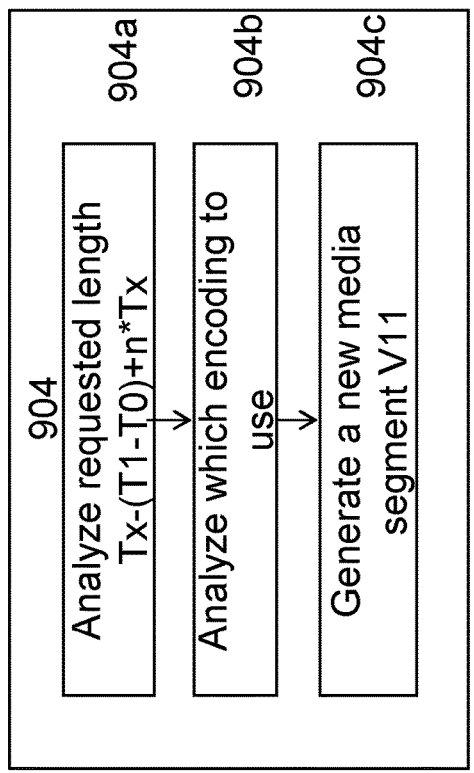

With reference to FIG. 11, FIG. 4B (400, 410, 415, 420, 430, 440), and FIG. 5A (500), in one embodiment the network element creates 904 the segment having a different length than the segment that the stream originally was divided in by analyzing the requested length (904a) and which encoding to use (904b), and then generates a new media segment V11.

When providing the segment having a different length V11 the network element adapts the segment to the stream that the client has requested. Parameters used may be the encoding, type of codec used, type of container, lowest bitrate, length, and width and height With reference to FIG. 12 and FIG. 5B (510), in one embodiment the network element creates 904 the segment having a different length than the segment that the stream originally was divided in by analyzing the requested length (904a) and which encoding to use (904b), and then reads a corresponding media segment V11 from a storage (904c).

Figure 12:
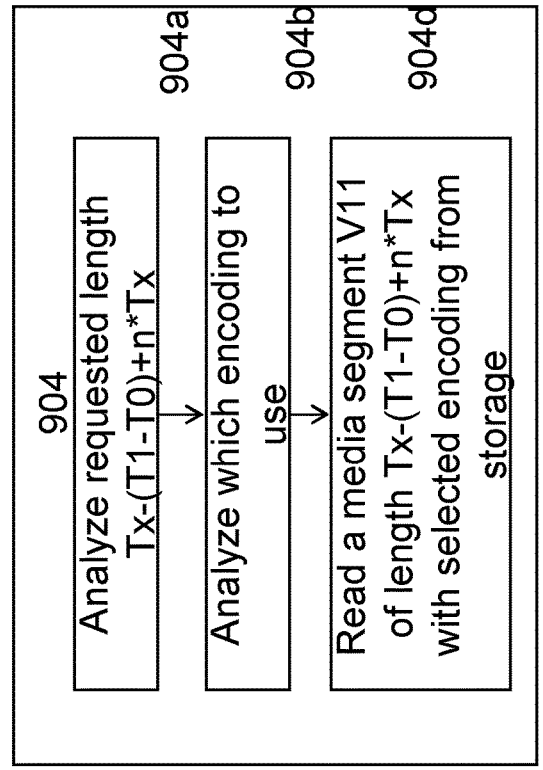

With reference to FIG. 12, FIG. 5B (520), and FIG. 16, in one embodiment the network element creates 904 a set of segments of correct total length by analyzing the requested length (904a) and which encoding to use (904b), and then reads corresponding media segment(S) V11 and V21 from a storage (904c).

With reference to FIG. 12, FIG. 5C (530), and FIG. 17, in one embodiment the network element creates 904 a segment being longer than the segment that the stream originally was divided in by analyzing the requested length (904a) and which encoding to use (904b), and then reads corresponding media segment(S) V11 and V21 from a storage (904c).

The network element can be an encoder receiving the media data to be encoded and providing an encoded representation of the media data in a stream divided into segments.

When the network element is an encoder it can create and send 600 a stream of segments comprising only self-contained key frames to be used for creating the segment having a different length than the segment that the stream originally was divided in and/or a slicing stream of segments specifically adapted to be used for creating the segment having a different length than the segment that the stream originally was divided in as illustrated in FIG. 6.

Alternatively, the network element can be a proxy associated with a server receiving an encoded representation of the media data in a stream divided into segments from the server and configured to provide segments with media data to a client. The proxy may be included in the server.

When the network element is a proxy it can receive a stream of segments comprising only key frames to be used for creating the segment having a different length than the segment that the stream originally was divided in and/or receive a slicing stream of segments specifically adapted to be used for creating the segment having a different length than the segment that the stream originally was divided in.

Figure 13A:
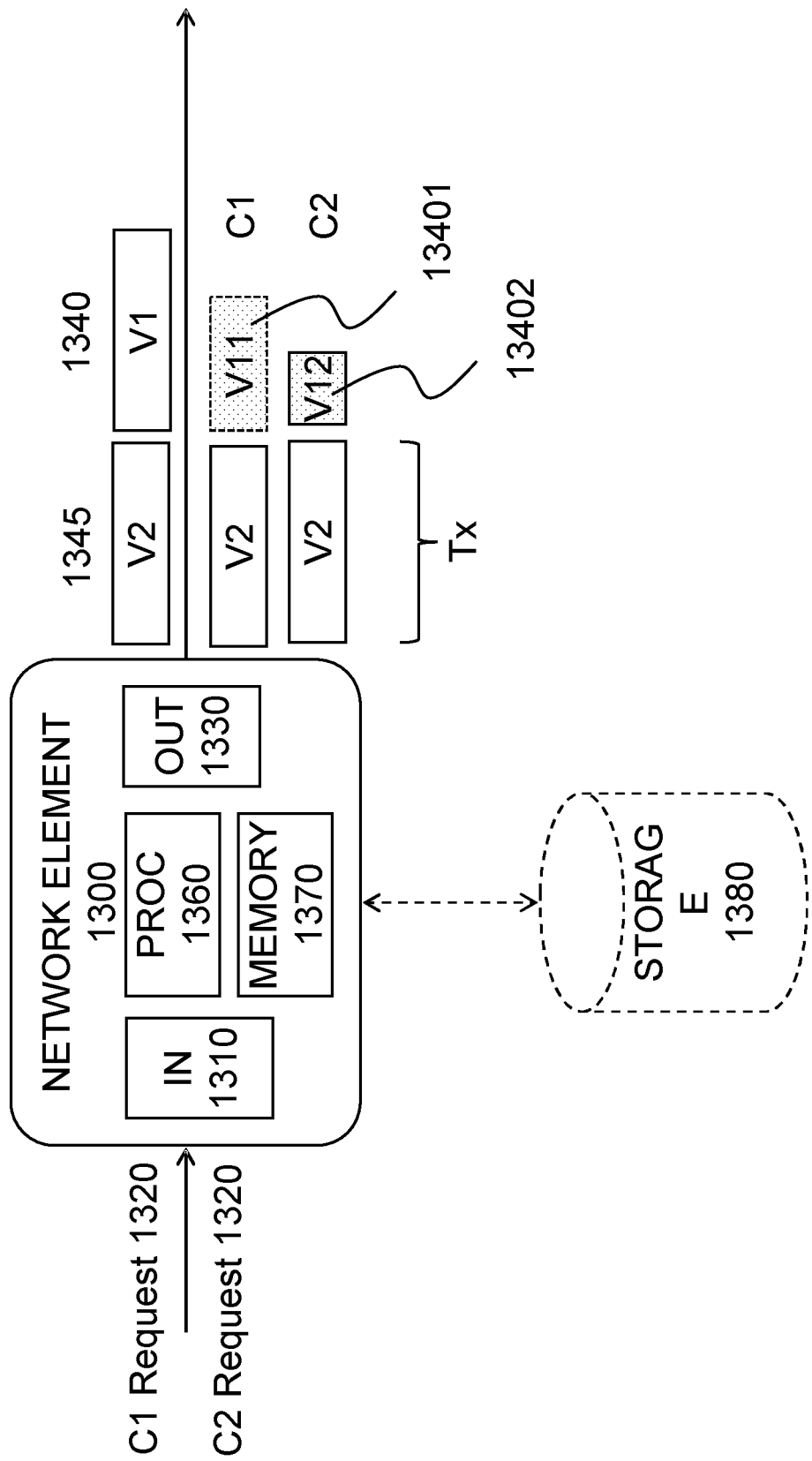
FIG. 13a-13b illustrate schematically a network element according to embodiments of the present invention.

According to a further aspect of the embodiments, a network element 1300 for enabling streaming of media data is provided as illustrated in FIG. 13A. The media data is originally divided into segments of a first length Tx provided in a stream and the media data is represented by non-self-contained frames and self-contained key frames in the segments. The network element 1300 comprises an input unit 1310 configured to receive a request 1320 for media data of a stream (either direct from the device the user use to retrieve the media stream, such as a set-top box, or via a server), and an output unit 1330 configured to provide a segment V11 13401 of a different length than said first length Tx, such that the segment V11 13401 has a length, a starting point and an ending point, wherein the starting point is aligned to a time of said request and the ending point is aligned to a segment subsequent to V1 1340, where the segment V11 13401 comprises data not belonging to segment V1 1340, and a first frame of the provided segment is a self-contained key frame and configured to provide a subsequent segment of the requested stream wherein the subsequent segment is a segment that the stream originally was divided in. In the examples in FIGS. 13A and 13B the provided segment 1340 is shorter than the segment that the stream originally was divided in.

According to embodiments the network element 1300 is further operative to fetch the segment 13401 having a different length than the segment that the stream originally was divided in from a storage 1380 with pre-encoded segments of various length and encoding.

According to an embodiment, the network element 1300 providing the segment having a different length is also configured to create the segment having a different length. Therefore the network element 1300 comprises a processor 1360 configured to create the segment 13401 having a different length than the segment 1340 that the stream originally was divided. The processor 1360 may be configured to create the segment 13401 having a different length than the segment 1340 that the stream originally was divided in.

According to an embodiment the network element 1300 is, further operative to calculate the length of the segment V11 13401 having a different length than the segment that the stream originally was divided in as being the difference between the original segment length Tx and the time that has passed between a timestamp T0 which is set when a segment V1 is arrived in the network element and a timestamp T1 that is set when the network element receives the request from client C1 during the streaming of said segment V1, plus a multiple of the original segment length n*Tx, where n is zero or an integer.

According to further embodiments the network element 1300 is further operative to store e.g. channel information or information about the streamed program into the storage 1380.

According to an embodiment the network element 1300 is further operative to receive another request for media data of said stream, and to provide another segment V12 13402 of a different length than said first length Tx, where the segment comprise recorded data not belonging to said stream, and to provide at substantially the same time to all users consuming the stream, a segment, subsequent to segment V1, of said stream wherein the subsequent segment is a segment that the stream originally was divided in.

According to an embodiment the network element 1300 is further operative to generate a timestamp when a segment is arrived in the network element and to generate another timestamp when the network element receives a request for the media stream.

Furthermore, multiple segments having a different length can be provided. That implies that the output unit 1330 may be configured to provide another segment than the currently streamed segment of the requested stream, wherein the segment has a first length and is having a different length than the segment that the stream originally was divided in and a first frame of the provided segment is a self-contained key frame, and to provide another segment than the currently streamed segment of the requested stream, wherein the segment has a second length different from the first length and is having a different length than the segment that the stream originally was divided in and a first frame of the provided segment is a self-contained key frame.

As mentioned above, the segments having a different length can be created in various ways. Hence, the processor 1360 may be configured to create the segment having a different length than the segment that the stream originally was divided in by cutting off frames from a segment of a stream that is intended to use for replacement of the first frame when zapping, wherein the start or the end of the segment is being used as the segment having a different length. If the end of the cut off segment is used, a new self-contained key frame is inserted in the beginning of the segment having a different length than the segment that the stream originally was divided in.

Further, the processor 1360 may be configured to insert the new self-contained key frame by calculating the new key frame based on frames being cut off. E.g., the processor 1360 is configured to insert the new self-contained key frame by retrieving a key frame from a stream of segments comprising only key frames.

In some embodiments, the network element that provides the segment having a different length also creates the segment having a different length t. In one case the processor is configured to fetch the segment from a storage 1380 with pre-encoded segments of various length s and encodings.

In another case, the processor is configured to create the segment having a different length than the segment that the stream originally was divided in by decoding a segment of another stream that is intended to use for replacement of the first frame when zapping, and encoding the decoded segment into a different length than the segment that the stream originally was divided in. That can be done in the encoder or in the proxy. If it is done in the proxy, the proxy comprises a transcoder for performing the encoding and decoding. The transcoder can be implemented by a processor.

Thus, the network element can be an encoder configured to receive the media data to be encoded and to provide an encoded representation of the media data in a stream divided into segments. This entity is referred to as encoder, since the main purpose is to encode the bit stream of the media data to a representation that is compressed to be better suitable for transmission. However, the encoder also has other capabilities in addition to the functionalities relating to the embodiments of the present invention.

When the network element is an encoder, the processor may be configured to create a stream of segments comprising only self-contained key frames to be used for creating the segment having a different length than the segment that the stream originally was divided in and/or configured to create a slicing stream of segments specifically adapted to be used for creating the segment having a different length than the segment that the stream originally was divided in.

As mentioned above, the network element may be a proxy. The proxy is associated with a server from which the proxy receives the encoded representation of the media data. As an example the proxy may be included in the server that it is associated with. Accordingly, the proxy is configured to receive an encoded representation of the media data in a stream divided into segments from the server and configured to provide segments with media data to a client.

According to an embodiment, the input unit is further configured to receive a stream of segments comprising only key frames to be used for creating the segment having a different length than the segment that the stream originally was divided in. This stream of segments can be received from the encoder.

In another embodiment, the input unit is further configured to receive a slicing stream of segments specifically adapted to be used for creating the segment having a different length than the segment that the stream originally was divided in. This slicing stream can be received from the encoder.

Figure 13B:
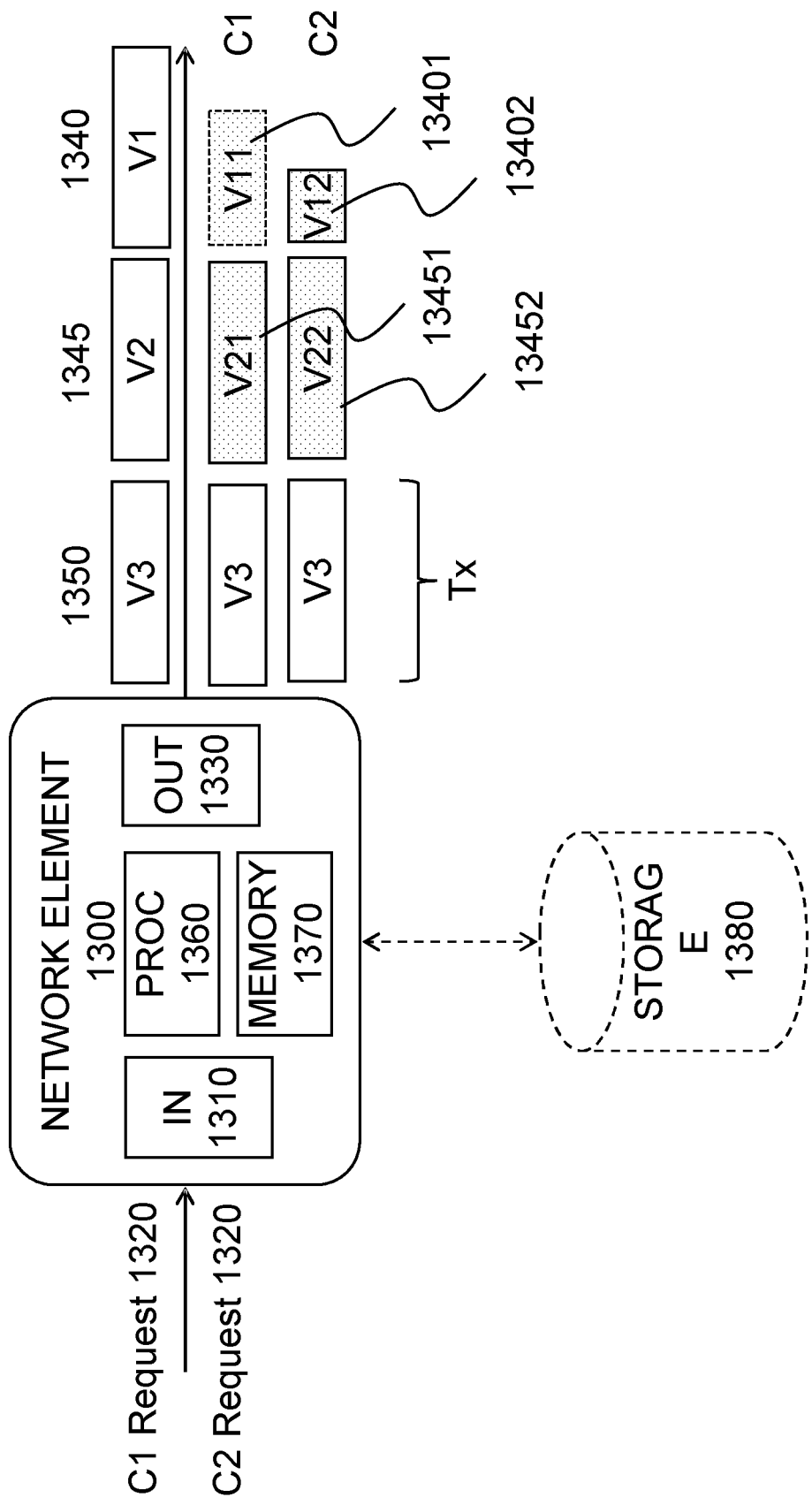

According to further aspects of the embodiments as illustrated in FIG. 13B, the network element 1300 as described in embodiments above is further operative to, after providing the segment 13401 having a different length than the length the stream was originally divided in, provide one V21 13451 or many additional segments comprising data not belonging to said stream before providing at substantially the same time as to all clients consuming said stream, a segment, subsequent to segment V1, of said stream wherein the subsequent segment is a segment that the stream originally was divided in The network element with it's including units could be implemented in hardware. There are numerous variants of circuitry elements that can be used and combined to achieve the functions of the units of the network element. Such variants are encompassed by the embodiments. Particular examples of hardware implementation of the network element are implementation in digital signal processor (DSP) hardware and integrated circuit technology, including both general-purpose electronic circuitry and application-specific circuitry.

Figure 13C:
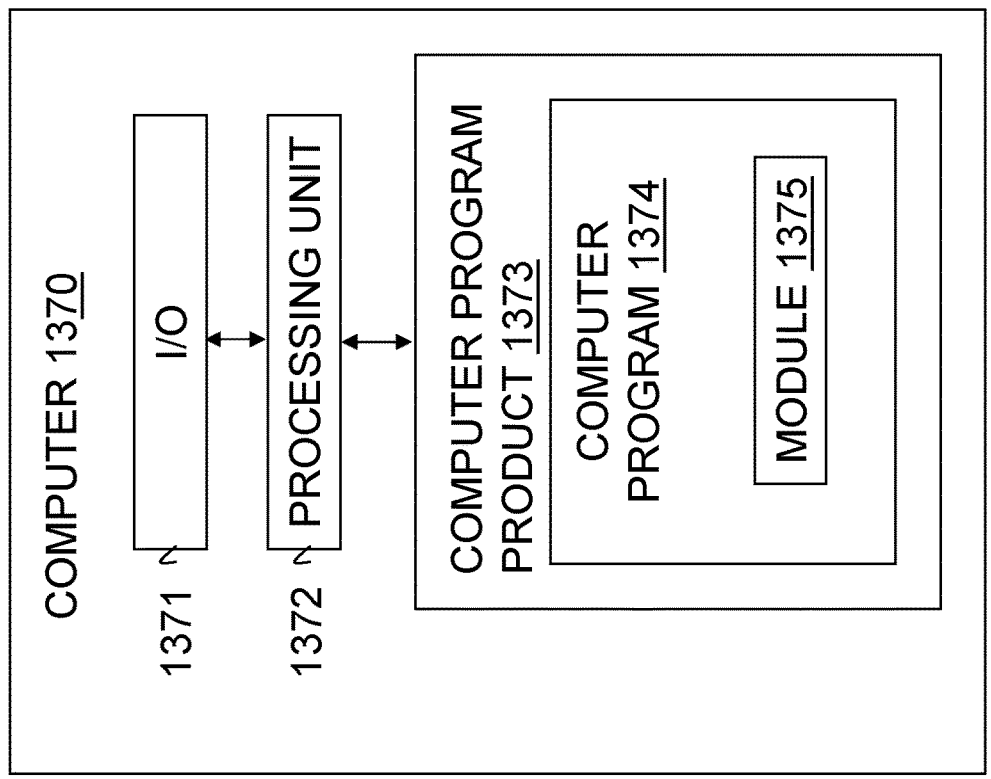
FIG. 13c illustrates schematically a computer according to a possible implementation of the embodiments of the present invention.
Figure 14:
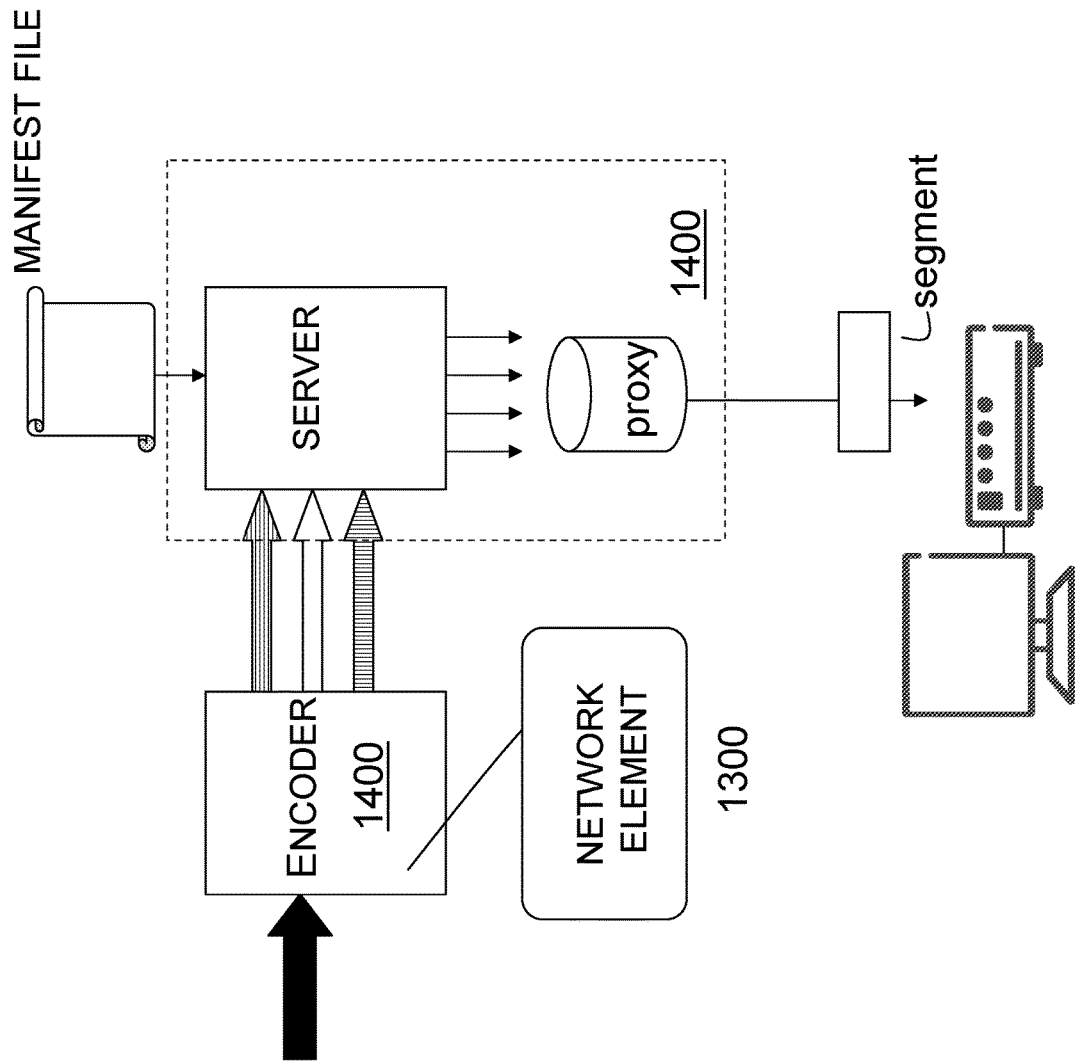
FIGS. 14-15 illustrate schematically a respective network where the embodiments can be implemented.
Figure 15:
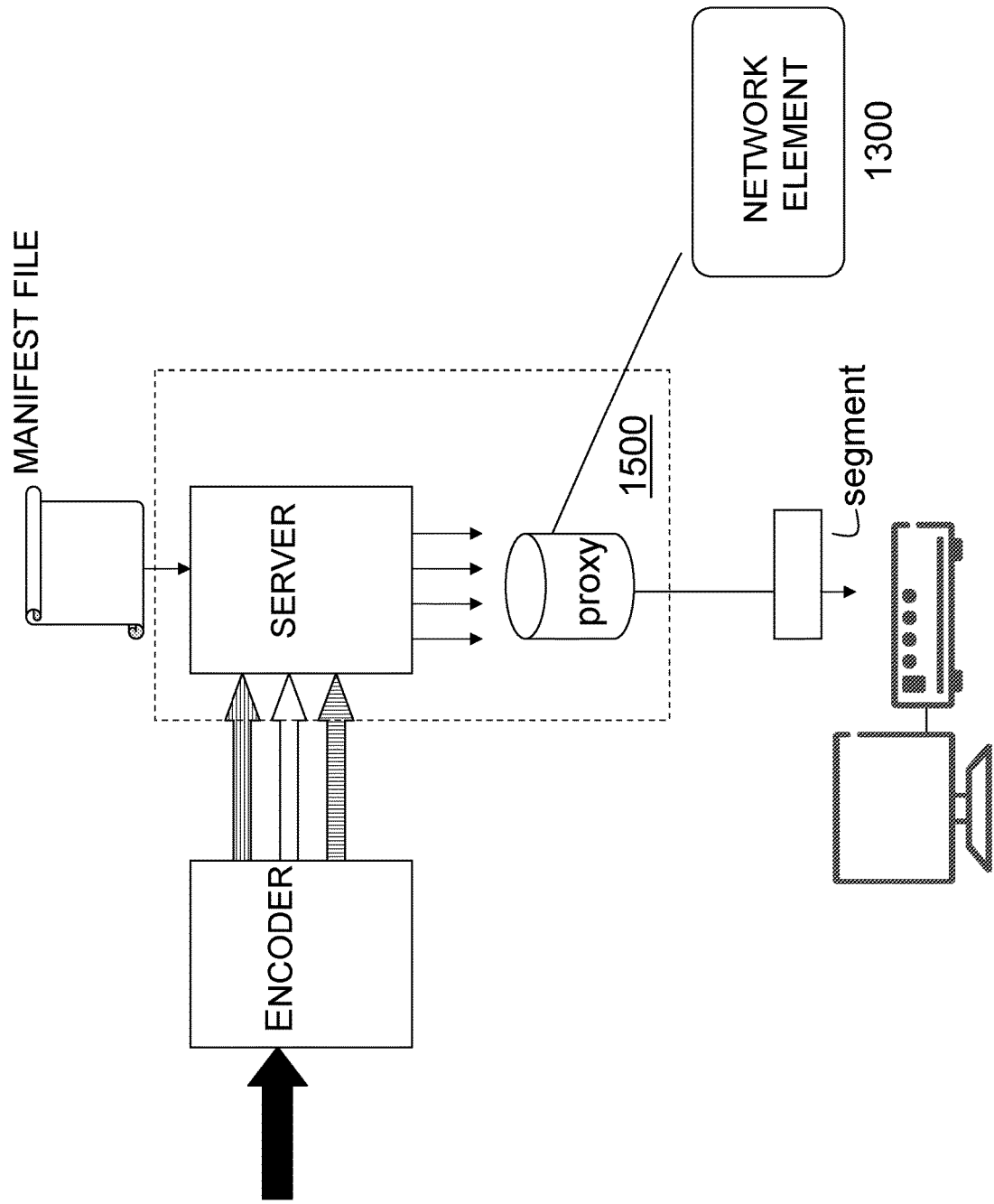

The network element described herein could alternatively be implemented e.g. by one or more of a processing unit and adequate software with suitable storage or memory therefore, a programmable logic device (PLD) or other electronic component(s) as shown in FIG. 13C.

FIG. 13C schematically illustrates an embodiment of a computer 1370 having a processing unit 1372, such as a DSP (Digital Signal Processor) or CPU (Central Processing Unit). The processing unit 1372 can be a single unit or a plurality of units for performing different steps of the method described herein. The computer 1370 also comprises an input/output (I/O) unit 1371 for receiving recorded or generated video frames or encoded video frames and outputting the segments having a different length. The I/O unit 1371 has been illustrated as a single unit in FIG. 13C but can likewise be in the form of a separate input unit and a separate output unit.

Furthermore, the computer 1370 comprises at least one computer program product 1373 in the form of a non-volatile memory, for instance an EEPROM (Electrically Erasable Programmable Read-Only Memory), a flash memory or a disk drive. The computer program product 1373 comprises a computer program 1374, which comprises code means which when run on or executed by the computer, such as by the processing unit, causes the computer to perform the steps of the method described in the foregoing in connection with FIGS. 9-12. Hence, in an embodiment the code means in the computer program comprises a module 1375 configured to implement embodiments as disclosed herein or combinations thereof. This module 1375 essentially performs the steps of the flow diagrams in FIGS. 9-12 when run on the processing unit 1372. Thus, when the module 1375 is run on the processing unit 1372 it corresponds to the corresponding units of FIG. 13A.

The main objective of the embodiments is to let all users receive the media stream in synch.

In further embodiments, as illustrated in FIG. 16, when client C1 request the media stream while streaming the segment V1 of the requested stream the network element provides to client C1 a first segment V11 having a different length, in this example shorter, than the actual segment V11, as described in the embodiments above, and then further provides one or many subsequent segments comprising data not belonging to segment V1. In FIG. 16 that is illustrated with one additional segment V21, but it could be more segments dependent on the desired total length. This enables the possibility to provide e.g. commercials or information that is longer than the length Tx that the stream was originally divided in. After the segments with data not belonging to V1 has been provided to the client, the network elements provides a subsequent segment belonging to the original media stream to client C1 at substantially the same time as to other clients consuming the stream. IN this example with one additional segment V21 the segment subsequent to segment V1 would be segment V3. The segment having a different length V11 and the subsequent segments comprising data not belonging to segment V1 is created by the network element or fetched from a storage with sets of segments of various length and encoding as illustrated in FIG. 5B (520).

The total length of the length of the segment having a different length V11 and the subsequent segments comprising data not belonging to V1 can be calculated as $Tx-(T1-T0)+n*Tx$ where n=is zero or an integer.

In FIG. 16 it is also illustrated that a client C2 when joining the stream will receive a segment V12 of a length adjusted to the time client C2 requested the stream.

It is further illustrated that another client C3 may request the stream while streaming another segment than V1, in this example during segment V2. In accordance with above, the network element will to client C3 provide a segment having a different length V23, and a subsequent V32 before providing the segment V4 at substantially the same time as to other clients consuming the stream.

In further embodiments, as illustrated in FIG. 17, when client C1 request the media stream while streaming the segment V1 of the requested stream the network element provides a segment V11 with a longer length than the length Tx that the stream was originally divided in, said segment comprising data not belonging to V1. This enables the possibility to provide e.g. commercials or information that is longer than the length Tx that the stream was originally divided in. After the longer segments with data not belonging to V1 has been provided to the client, the network elements provides a subsequent segment belonging to the original media stream to client C1 at substantially the same time as to other clients consuming the stream. The segment having a different length V11 is created by the network element or fetched from a storage as illustrated in FIG. 5C. The length of the segment can be calculated as $Tx-(T1-T0)+n*Tx$ where n=is zero or an integer.

In FIG. 17 it is also illustrated that a client C2 when joining the stream will receive a segment V12 of a length adjusted to the time client C2 requested the stream.

The invention claimed is:
1. A method to be performed by a network element for enabling streaming of media data, wherein the media data is originally divided into segments of a first length Tx provided in a stream, the method comprises:
receiving, from a client C1 during streaming of a segment V1 of said stream, a request for media data of said stream;

providing, to said client C1, a segment V11 having a different length than said first length Tx, such that the segment V11 has a length, a starting point and an ending point, wherein the starting point is aligned to a time of said request and the ending point is aligned to a segment subsequent to V1, wherein the segment V11 comprises data not belonging to segment V1;

providing, to said client C1, a segment, subsequent to segment V1, of said stream wherein the subsequent segment is a segment that the stream originally was divided in;

receiving, from another client C2 during streaming of a segment V1 of said stream, a request for media data of said stream;

providing, to said client C2, a segment V12 of a different length than said first length Tx, where the segment comprises recorded data not belonging to said stream; and providing, to both client C1 and client C2 at substantially the same time, a segment, subsequent to segment V1, of said stream wherein the subsequent segment is a segment that the stream originally was divided in.

2. The method according to claim 1, wherein the segment V11 having a different length than the segment that the stream originally was divided in is generated on demand by the network element.

3. The method according to claim 1, wherein the segment V11 having a different length than the segment that the stream originally was divided in is fetched from a storage with pre-encoded segments of various length and encoding.

4. The method according to claim 1, wherein the length of the segment V11 having a different length than the segment that the stream originally was divided in is calculated as being the difference between the original segment length Tx and a time that has passed between a timestamp T0 which is set when a segment V1 is arrived in the network element and a timestamp T1 that is set when the network element receives the request from client C1 during the streaming of said segment V1, plus zero or an integer multiple of the original segment length Tx.

5. The method according to claim 1, wherein additional segments comprising data not belonging to said stream are provided before providing a segment, subsequent to segment V1, of said stream wherein the subsequent segment is a segment that the stream originally was divided in.

6. The method according to claim 1, wherein the segment of different length is shorter than said first length Tx.

7. The method according to claim 1, wherein a timestamp T0 is generated when the network element provides a segment to the first client requesting the media stream.

8. A network element for enabling streaming of media data, wherein the media data is originally divided into segments of a first length Tx provided in a stream, comprising a processor and memory, said memory containing instructions executable by said processor whereby said network element is operative to:

receive, from a client C1 during streaming of a segment V1 of said stream, a request for media data of said stream;

provide, to said client C1, a segment V11 of a different length than said first length Tx, such that the segment V11 has a length, a starting point and an ending point, wherein the starting point is aligned to a time of said request and the ending point is aligned to a segment subsequent to V1, wherein the segment V11 comprises data not belonging to segment V1;

provide, to said client C1, a segment, subsequent to segment V1, of said stream wherein the subsequent segment is a segment that the stream originally was divided in;

receive, from another client C2 during streaming of a segment V1 of said stream, a request for media data of said stream;

provide, to said client C2, a segment V12 having a different length than said first length Tx, wherein the segment comprises recorded data not belonging to said stream; and provide, to both client C1 and client C2 at substantially the same time, a segment, subsequent to segment V1, of said stream wherein the subsequent segment is a segment that the stream originally was divided in.

9. The network element according to claim 8, further operative to fetch the segment V11 having a different length than the segment that the stream originally was divided in from a storage with pre-encoded segments of various length and encoding.

10. The network element according to claim 8, further operative to create the segment having a different length than the segment that the stream originally was divided in.

11. The network element according to claim 8, further operative to calculate the length of the segment V11 having a different length than the segment that the stream originally was divided in as being the difference between the original segment length Tx and a time that has passed between a timestamp T0, that is set when a segment V1 is arrived in the network element, and a timestamp T1, that is set when the network element receives the request from client C1 during the streaming of said segment V1, plus zero or an integer multiple of the original segment length Tx.

12. The network element according to claim 8, further operative to store channel information into a storage.

13. The network element according to claim 8, further operative to store information about a streamed program into a storage.

14. The network element according to claim 8, further operative to:

provide, to said client C1, one segment V21 or two or more additional segments comprising data not belonging to said stream before providing at substantially the same time as to all clients consuming said stream, a segment, subsequent to segment V1, of said stream wherein the subsequent segment is a segment that the stream originally was divided in.

15. The network element according to claim 8, wherein the segment of different length is shorter than said first length Tx.

16. The network element according to claim 8, further operative to generate a timestamp when the network element provides a segment to the first client requesting the media stream.

17. A computer program product comprising a non-transitory computer readable medium storing computer code for streaming media data, wherein the media data is originally divided into segments of a first length Tx provided in a stream, the computer code comprising instructions to:

receive, from a client C1 during streaming of a segment V1, a request for media data of said stream;

provide, to said client C1, a segment V11 of a different length than said first length Tx, such that the segment V11 has a length, a starting point and an ending point, wherein the starting point is aligned to a time of said request and the ending point is aligned to a segment subsequent to V1, wherein the segment V11 comprises data not belonging to segment V1;

provide, to said client C1, a segment, subsequent to segment V1, of said stream wherein the subsequent segment is a segment that the stream originally was divided in;

receive, from another client C2 during streaming of a segment V1 of said stream, a request for media data of said stream;

provide, to said client C2, a segment V12 having a different length than said first length Tx, wherein the segment comprises recorded data not belonging to said stream; and provide, to both client C1 and client C2 at substantially the same time, a segment, subsequent to segment V1, of said stream wherein the subsequent segment is a segment that the stream originally was divided in.

* * * * *